United States Patent
Shima

(10) Patent No.: US 7,639,381 B2
(45) Date of Patent: Dec. 29, 2009

(54) PRINTING DEVICE THAT DISTRIBUTES A PRINT JOB AMONG ALTERNATIVE PRINTING DEVICES CONNECTED TO A NETWORK

(75) Inventor: Toshihiro Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1038 days.

(21) Appl. No.: 10/723,231

(22) Filed: Nov. 25, 2003

(65) Prior Publication Data

US 2004/0158654 A1 Aug. 12, 2004

(30) Foreign Application Priority Data

Nov. 29, 2002 (JP) ............................. 2002-347961
Feb. 25, 2003 (JP) ............................. 2003-046739

(51) Int. Cl.
  *G06K 15/00* (2006.01)
  *G06F 3/00* (2006.01)
(52) U.S. Cl. ....................................... 358/1.15; 358/1.1
(58) Field of Classification Search .................. 358/1.1, 358/1.8, 1.9, 1.12, 1.13, 1.14, 1.15, 402, 358/448; 709/201, 203, 208, 220
  See application file for complete search history.

(56) References Cited

U.S. PATENT DOCUMENTS

| 7,154,630 B1 | 12/2006 | Nimura et al. |
| 2002/0080388 A1 | 6/2002 | Chrisop et al. |
| 2002/0149799 A1* | 10/2002 | Hayashi .................... 358/406 |
| 2003/0007818 A1* | 1/2003 | Kato ............................. 400/61 |
| 2003/0038962 A1* | 2/2003 | Shimada .................... 358/1.15 |

FOREIGN PATENT DOCUMENTS

| EP | 0 729 090 | 8/1996 |
| JP | 07-203097 | 8/1995 |
| JP | 10-040037 | 2/1998 |
| JP | 2000-155654 | 6/2000 |
| JP | 2000-318268 | 11/2000 |

(Continued)

OTHER PUBLICATIONS

Abstract of Japanese Patent Publication No. 2000-155654, Pub. Date: Jun. 6, 2000, Patent Abstracts of Japan.

(Continued)

*Primary Examiner*—Gabriel I Garcia
(74) *Attorney, Agent, or Firm*—Martine Penilla & Gencarella, LLP

(57) ABSTRACT

A printing system is constructed by connecting a client and multiple printers to a network. A printer PRT1 receives a print job JOB0, which includes specification of a plural number of copies to be printed, from the client, changes the specified plural number of copies to one copy as a modified print job JOB1, and distributes the modified print job JOB1 to other printers specified as alternative printers. The printer PRT1 manages a total number of copies including a number of copies distributed to the specified alternative printers and a number of copies printed by the printer PRT1 itself, so as to eventually attain printing of the specified number of copies. The printer having these functions enables the simply constructed printing system including the multiple printers to implement distributed printing of a print job that specifies printing of plural copies.

16 Claims, 18 Drawing Sheets

FOREIGN PATENT DOCUMENTS

| | | |
|---|---|---|
| JP | 2001-162898 | 6/2001 |
| JP | 2001-249782 | 9/2001 |
| JP | 2001-296982 | 10/2001 |
| JP | 2001-328319 | 11/2001 |
| JP | 2001-337802 | 12/2001 |
| JP | 2002-055787 | 2/2002 |
| JP | 2002-073312 | 3/2002 |
| JP | 2002-163092 | 6/2002 |
| JP | 2002-215369 | 8/2002 |

OTHER PUBLICATIONS

Abstract of Japanese Patent Publication No. 2000-318268, Pub. Date: Nov. 21, 2000, Patent Abstracts of Japan.

Abstract of Japanese Patent Publication No. 2001-337802, Pub. Date: Dec. 7, 2001, Patent Abstracts of Japan.

Abstract of Japanese Patent Publication No. 2002-055787, Pub. Date: Feb. 20, 2002, Patent Abstracts of Japan.

Abstract of Japanese Patent Publication No. 2002-073312, Pub. Date: Mar. 12, 2002, Patent Abstracts of Japan.

Abstract of Japanese Patent Publication No. 2002-215369, Pub. Date: Aug. 2, 2002, Patent Abstracts of Japan.

Abstract of Japanese Patent Publication No. 07-203097, Pub. Date: Aug. 4, 1995, Patent Abstracts of Japan.

Abstract of Japanese Patent Publication No. 10-040037, Pub. Date: Feb. 13, 1998, Patent Abstracts of Japan.

Abstract of Japanese Patent Publication No. 2001-162898, Pub. Date: Jun. 19, 2001, Patent Abstracts of Japan.

Abstract of Japanese Patent Publication No. 2001-249782, Pub. Date: Sep. 14, 2001, Patent Abstracts of Japan.

Abstract of Japanese Patent Publication No. 2001-296982, Pub. Date: Oct. 26, 2001, Patent Abstracts of Japan.

Abstract of Japanese Patent Publication No. 2001-328319, Pub. Date: Nov. 27, 2001, Patent Abstracts of Japan.

Abstract of Japanese Patent Publication No. 2002-163092, Pub. Date: Jun. 7, 2002, Patent Abstracts of Japan.

* cited by examiner

PRINTING DEVICE THAT DISTRIBUTES A PRINT JOB AMONG ALTERNATIVE PRINTING DEVICES CONNECTED TO A NETWORK

BACKGROUND OF THE INVENTION

1. Field of the Invention

The present invention relates to a technique that is applied to a printing environment where multiple printing devices are connected to a network and that distributes a print job among the multiple printing devices to attain distributed printing.

2. Description of the Related Art

In a printing system that has become widespread recently, multiple printers are connected to one identical network and each user selectively uses the multiple printers. A technique of distributed printing is also proposed (for example, JP2002-215369A). The distributed printing technique distributes a print job including a plural number of copies to be printed to multiple printers and shortens the total printing time by parallel processing. In the distributed printing system, a print server exclusively used for distributed printing on the network generally controls the destinations of distribution of the print job and the number of printed copies.

The conventional technique requires a large-scaled system including a server to attain distributed printing, and has some drawbacks discussed below. The first problem is a difficulty in management of the total number of printed copies, when some error arises in any of the printers in the course of printing. For example, it is assumed that printing of 100 copies is required and that each of two printers takes charge of printing 50 copies. When an error arises in one of the printers in the course of printing, the user is required to count the number of copies printed by the printer with the error, calculate a residual number of copies to be printed, and generate a print job including the residual number.

The second problem is that a print job is possibly distributed to printers that are located at distant places, since the printers having closer network addresses may not be physically closer. This may impose a heavy load of collecting the resulting prints on the user.

SUMMARY OF THE INVENTION

In order to eliminate the drawbacks of the conventional technique, a printing system of the invention aims to readily specify printers as destinations of distribution and attain distributed printing by a simple system structure.

A printing device of the invention is used in a printing environment where multiple printing devices including the printing device of the invention are connected to a network. The printing device of the invention receives a print job, which includes specification of a number of copies to be printed, from a device connecting with the network, for example, a computer or another printing device. The printing device specifies each of other printing devices connecting with the network as an alternative printing device to which the print job is transferable. When the specified number of copies to be printed is a plural number, the printing device transfers a modified print job, which includes setting of a less number of copies than the specified number (hereafter referred to as a 'distributed number of copies'), to at least part of the specified alternative printing devices for printing. The print device manages a total number of copies including a number of copies transferred and printed by at least part of the specified alternative printing devices, so as to eventually attain printing of the specified number of copies. The printing device itself of the invention takes charge of transfer of the print job and does not require any exclusive server to attain distributed printing.

The copy number management may be carried out at a diversity of timings. For example, one procedure may regard the number of copies that has been transferred to the alternative printing device, as the number of printed copies and calculate the total number of printed copies. Another procedure may determine completion of printing at the time when the printing device receives a notice of completed printing from the alternative printing device.

The transfer of the modified print job may be restricted to only once or may be repeatedly executed when there are a multiple number of copies to be printed. In the latter case, a preferable procedure performs a next cycle of transfer after receiving a notice of print completion with regard to the modified print job transferred in a former cycle. This arrangement controls the destination of transfer with the progress of printing, thus ensuring efficient execution of printing.

In the case of repeated transfer, the modified print job may be sent to the alternative printing device each time. When the alternative printing device has a function of spooling the print job therein, only a print execution instruction may be retransmitted to the printing device that spools the modified print job. This arrangement does not require retransmission of the modified print job and thus desirably relieves the traffic in the network and shortens the total processing time.

In one preferable application, the printing device of the invention notifies the device, which has transmitted the print job, of a total number of printed copies including the number of copies printed by at least part of the specified alternative printing devices. The device as the sender of the original print job can remotely grasp the number of printed copies via the network. This arrangement enhances the utility of the printing system.

The number of copies to be distributed simultaneously is arbitrarily set and may be plural or singular. Setting a plural number of copies advantageously reduces the frequency of transfer of the modified print job. When a small number, for example, '1', is set to the number of copies to be distributed simultaneously, the effects of a potential error arising in the course of printing may be minimized. In such cases, another printing device that normally works is utilized to take over the print job, which has been interrupted by some error. Setting the small number naturally minimizes the number of failed copies and facilitates the copy number management.

In another preferable application, the printing device of the invention retrieves a printing device on the network that is able to execute printing of the print job without any conversion and specifies the retrieved printing device as the alternative printing device. One applicable procedure may retrieve printing devices of an identical model with the own model of the printing device. Another applicable procedure may retrieve printing devices that satisfy specifications set in the print job, for example, the paper size, the availability of color/monochromatic printing, the availability for double-sided printing, the font, and the resolution. This arrangement assures execution of appropriate printing without any data conversion of the print job. This also ensures the uniform quality, for example, the resolution and the font, of resulting prints by the printing device itself and the specified alternative printing devices.

The number of copies to be distributed may be set in various ways. One method evenly distributes the number of copies to all the alternative printing devices thus specified. Another method gives a difference in number of distribution to the alternative printing devices. One example of the latter method specifies a residual operating life with regard to each of the specified alternative printing devices, and sets the number of copies to be transferred to each of the specified alternative printing devices, based on the specified residual operating life. This arrangement desirably controls the end timing of the operating life of each alternative printing device.

The procedure may increase the number of copies to be transferred to the alternative printing device having a longer residual operating life. This makes multiple printing devices come to the end of their operating lives at substantially simultaneous timings, thus facilitating an update plan or replacement plan of the multiple printing devices.

When each of the specified alternative printing devices has a preset target time reaching its operating life, the procedure may set the number of copies to be transferred to each of the specified alternative printing devices by taking into account the target time as well as the residual operating life. This arrangement enables each printing device to come to the end of its operating life according to an update plan or replacement plan of the printing devices. The target time may be set individually to each printing device or may be set collectively to a group of multiple printing devices.

The alternative printing device connecting with the network may be the printing device of the invention, that is, the printing device having the function of transferring a print job to another printing device. In a printing system including multiple printing devices of the invention connecting with one another via a network, the user is only required to send a print job to an arbitrary printing device, in order to attain distributed printing. This arrangement effectively enhances the utility of the printing system.

In this printing system, there is a possibility that an alternative printing device (referred to as 'child device'), which has the function of the invention and has received a print job sent from a printing device (referred to as 'parent device'), reversely transfers the received print job to the parent device. The reverse transfer of the print job may destabilize execution of the print job and the copy number management. One preferable measure against this potential problem attaches control information that prohibits further transfer of the modified print job from the specified alternative printing device to another printing device, to the modified print job. Each alternative printing device does not retransfer the modified print job with the control information to another printing device. This technique accordingly avoids the reverse transfer of the print job. Another preferable measure sets '1 copy' to the number of copies to be printed in the modified print job, in addition to attachment of the control information. The printing device of the invention is controlled to distribute an input print job, when a plural number is set to the number of copies to be printed. Setting '1 copy' thus effectively prevents retransfer of the print job from the child device.

The technique of the invention may prevent the reverse transfer discussed above, while allowing the child device to retransfer the print job to another alternative printing device (referred to as 'grandchild device'). One procedure adopted for this purpose retrieves a printing device on the network that has received either of the print job and the modified print job, and excludes the retrieved printing device from specification of the alternative printing device as the destination of transfer. The printing device to be excluded is specified, for example, by sending inquiries about the presence of a print job being spooled or being executed to the respective printing devices.

In order to readily specify the printing device to be excluded, one applicable procedure notifies the parent device of a grandchild device as a destination of transfer, when the child device retransfers the print job received from the parent device to the grandchild device. The notification includes, for example, the name, the address, and the ID of the grandchild device. This function collectively sends the information on the alternative printing devices specified as the destinations of transfer of the print job to a root printing device (referred to as 'root device'), which has first received an original print job from a client or another device other than a print device. Each printing device gives an inquiry to the root device and readily specifies the printing device to be excluded from the destination of transfer.

The root device may generate tabulated data for specifying all printing devices that execute either of the print job and the modified print job, based on the notification from each of the specified alternative printing devices, and may transmit the tabulated data to each of the specified alternative printing devices. For example, the tabulated data may be sent by broadcast or by multicast. This arrangement ensures delivery of the tabulated data, while avoiding an undesirable increase of the traffic in the network, even when there are a large number of the alternative printing devices specified.

Another preferable application of the invention evaluates a time required for execution of the modified print job with regard to each of the other printing devices on the network, and excludes each of the other printing devices having the required time of not less than a preset level from specification of the alternative printing device as the destination of transfer. This arrangement desirably shortens the total printing time. The object of evaluation may be a time required for communication in the network, instead of the time required for execution of the print job.

The printing device of the invention may execute printing by itself, while transferring the modified print job to other printing devices. In this case, the printing device may transfer the modified print job, synchronously with the timing of reading out the modified print job for self printing. This arrangement does not require the printing device to read out the modified print job only for the transfer, thus enhancing the efficiency of the transfer.

In the case of transfer of a print job to multiple printing devices at an identical timing, a printing device having a lower communication speed may regulate the overall transmission speed and undesirably lower the transfer efficiency. In order to avoid such a potential trouble, one preferable procedure divides the modified print job into multiple divisional data like packets, transmits the multiple divisional data to the specified alternative printing device, and manages a pointer for identifying a data position where transmission of the modified print job is completed, with regard to each of the specified alternative printing devices. This arrangement allows for transfer of the print job to the respective alternative printing devices at different speeds, thus enhancing the transfer efficiency. When the printing device has a marginal memory capacity, the method does not use multiple pointers but may duplicate the modified print job by the number of specified alternative printing devices and individually send the duplicates of the modified print job to the respective alternative printing devices.

The technique of the invention is not restricted to the printing device but may also be constructed as an output control device that controls each output device connecting with a network.

The output control device of the invention includes: a data receiver module that receives data to be output from a device connecting with the network; a retrieval module that retrieves each output device on the network; a working state detection module that detects a change in working state of each output device, caused by a user's operation of the output device, via the network; and an output device specification module that specifies each output device having the detected changed in working state as a receiver of the data to be output.

Here the output device may be any of projectors, display devices, printing devices, facsimiles, acoustic equipment, and a variety of other devices.

The output control device of the invention enables the user to readily specify a desired output device as a receiver. The output device having the detected change in working state may be specified as the receiver of the data or may alternatively be excluded from the specification as the receiver of the data. The output control device of the invention may be constructed in a server or in an output device. When the output control device is constructed in all output devices, the user may send data to any output device to attain the effects of the invention. In the case where the output control device of the invention is constructed in an output device, the output device may duplicate received data and send the duplicate data to another output device, while processing the received data by itself. The output device may alternatively send the received data to another output device, while not processing the data by itself.

For example, while the output control device establishes wireless communication with an output device on the network, a WEP key or an ESS-ID is invalidated for a certain time period. In the meanwhile, the user specifies each desired output device as a receiver and allocates a new WEP key or ESS-ID to the specified output device. This method is preferable for the good security. Another applicable method invalidates the WEP key or the ESS-ID for a certain time period after the user specifies each desired output device as a receiver. This arrangement enables an identical ID or an identical key to be shared by only specified devices among a large number of wireless devices. This technique is not restricted to the wireless communication but is preferably applicable to cipher communication according to a protocol like SSL.

The output control device of the invention may be constructed as a printing device, which is one embodiment of the output device. The working state of the printing device may be detected, for example, according to the SNMP protocol. The printing device as the distribution source may monitor the working state of another printing device or may be informed of a change in working state from another printing device. The detection of the working state is preferably performed within a preset time period.

The printing device of the invention allows for distributed printing to the user's desired printing devices. The user can readily grasp the physical position of each printing device specified as the destination of distribution.

In one preferable application, the output control device or the printing device of the invention has a working state coordination module that coordinates the working state of each retrieved output device or printing device via the network, prior to detection of the change in working state of the output device or the printing device. This arrangement ensures easy and accurate detection of a change in working state before and after the user's operation. This arrangement also coordinates the operation for setting the receiver of the data or the print job, thus desirably avoiding the potential for the user's confusion. The user can check the working state of each output device or printing device, prior to transmission of the data or the print job. For example, when one printing device is out of paper, the print job including the number of copies to be printed is distributed to other printing devices that work normally. This enhances the convenience of the printing system.

The working state may be detected every time the data or the print job is received. Detection of the working state may otherwise be carried out only once at the time of initial settings. Detection of the working state may be carried out at a diversity of timings, for example, when the setting of a retrieval range is changed, when a different device from those retrieved in a previous cycle of the settings is newly detected, or when the settings are cleared manually or by control from the network and resetting is required.

The working state as the object of detection may be any of diverse operations, for example, replacement of a cassette or an opening action of a cover, but is preferably an online-offline switchover. One procedure may specify a printing device having a change from an offline state to an online state as the alternative printing device. This operation is intuitively understandable. There is no change from the offline state to the online state when any error arises. The printing device having an error is thus readily excluded from the specification of the alternative printing device. After specification of the alternative printing devices, a command for setting all the printing devices online may be sent according to the SNMP protocol by broadcast.

The change from the offline state to the online state is not the essential factor of the specification. For example, each printing device having a change from the online state to the offline state under an error-free condition may be specified as an alternative printing device. In another example, each printing device having a change from the online state to the offline state and a further change to the online state may be specified as an alternative printing device. The alternative printing device may otherwise be specified by selecting a predetermined key set in each printing device, other than the online-offline switchover. The predetermined key may be any direct operation made by the user on each printing device, which is detectable via the network.

In one preferable embodiment of the output control device or the printing device of the invention, the retrieval module retrieves each output device or each printing device having an address in a specific range that satisfies a predetermined relation to its own address, for example, in a specific range having an identical sub-net. The address is not the essential factor of the retrieval. In another example, each output device or each printing device may be retrieved in an arbitrary group of output devices or printing devices, an arbitrary segment of output devices or printing devices, or any combination thereof.

In the printing device of the invention, the number of copies set in the modified print job is obtained by dividing the specified number of copies to be printed by a number of the alternative printing devices plus 1. This ensures equal distribution of the specified number of copies in the print job to the alternative printing devices, thus desirably shortening an overall printing time.

The technique of the invention is not restricted to the output control device or the printing device discussed above, but may be actualized by an output control method that causes an output control device connecting with a network to control data transmission and a printing method that causes a printing device to implement printing. A diversity of other possible applications include a computer program that attains the distributed printing described above, a recording medium in which such a computer program is recorded, and a data signal that includes such a computer program and is embodied in a carrier wave. Any of the various additional factors discussed above may be added to each of these applications.

In the case of the computer program or the recording medium in which such a computer program is recorded, the technique of the invention may be actualized by a whole program for controlling an output device or a whole program for controlling a printing device, as well as by part of the program attaining the characteristic functions of the invention. Typical examples of the recording medium include flexible disks, CD-ROMs, DVD-ROMs, magneto-optical disks, IC cards, ROM cartridge, punched cards, prints with barcodes or other codes printed thereon, internal storage devices (memories like RAMs and ROMs) and external storage devices of the computer, and a variety of other computer readable media.

DESCRIPTION OF THE PREFERRED EMBODIMENTS

Figure 1:
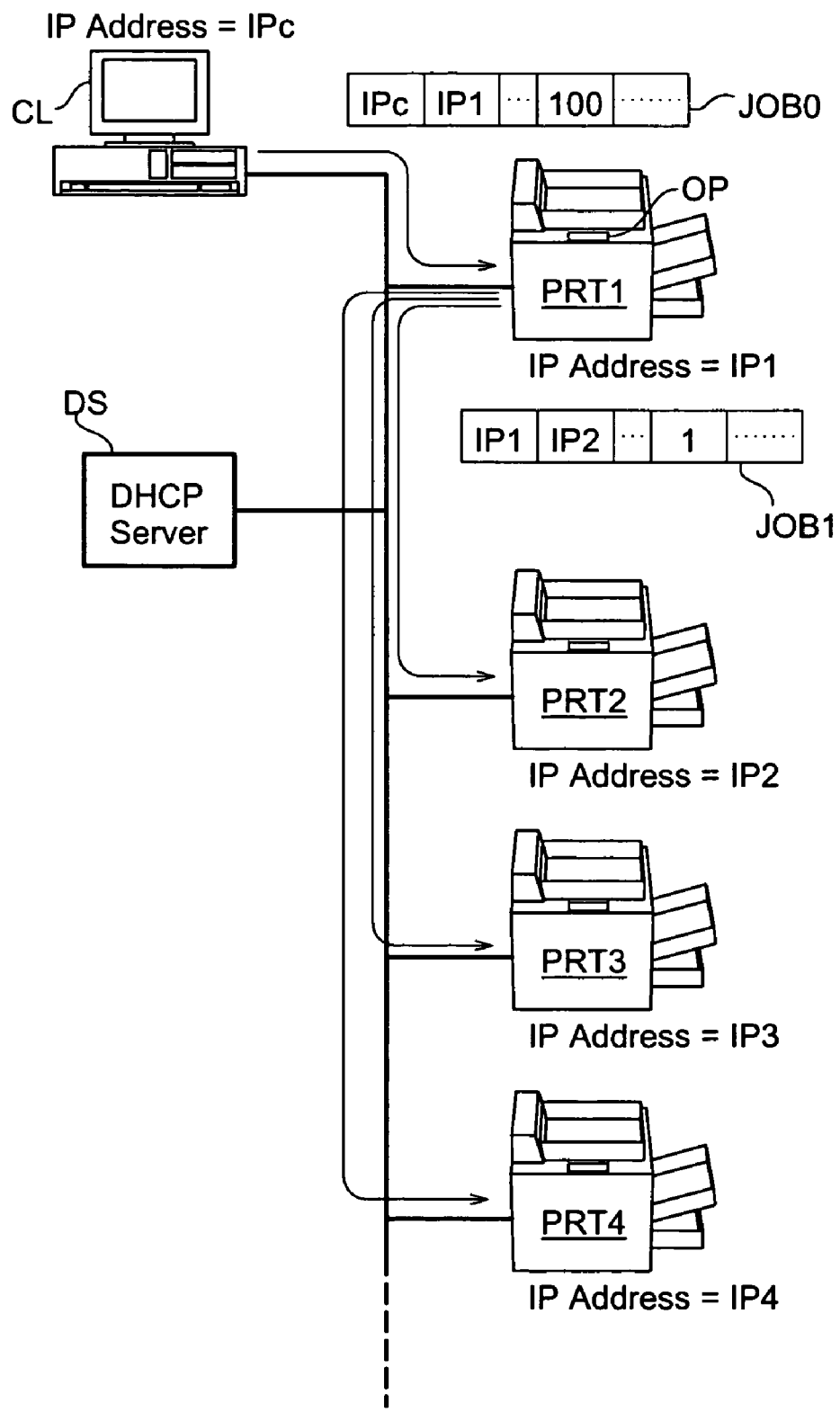
FIG. 1 schematically illustrates the construction of a printing system in a first embodiment of the invention.

Some modes of carrying out the invention are discussed below as preferred embodiments in the following sequence:
A. First Embodiment
 A1. Outline of System
 A2. Functional Blocks of Printer
 A3. Distributed Printing Process
 A4. Packet Transmission
B. Second Embodiment
 B1. Modified Example of Second Embodiment
C. Third Embodiment
D. Fourth Embodiment
E. Fifth Embodiment
 E1. Outline of System
 E2. Distributed Printing Process
 E3. Copy Number Management F. Sixth Embodiment
 F1. Outline of System
G. Modifications A. First Embodiment A1. Outline of System FIG. 1 schematically illustrates the construction of a printing system in a first embodiment of the invention. As illustrated, a client CL and multiple printers PRT1 through PRT4 are connected to a LAN in the structure of this embodiment. A DHCP server DS connecting with the LAN allocates IP addresses to the respective devices. As a matter of convenience, in the following description, it is assumed that an IP address 'IPc' is set to the client CL and that IP addresses 'IP1' through 'IP4' are respectively set to the printers PRT1 through PRT4.

Each of the printers PRT1 through PRT4 has a function of distributing a received print job to the other printers to attain distributed printing, as discussed below. In the illustrated example, a client CL transmits a print job JOB0 to the printer PRT1. The print job JOB0 has information including the IP address 'IPc' of the sender, the IP address 'IP1' of the receiver, and specification of a number of copies to be printed as '100 copies'.

The printer PRT1 receives the print job JOB0, generates a modified print job JOB1 by changing the specification of the number of copies to be printed to '1 copy', and distributes the modified print job JOB1 to the printer PRT2. In the transmission process, the IP address 'IP1' of the printer PRT1 is set to the IP address of the sender, and the IP address 'IP2' of the printer PRT2 is set to the IP address of the receiver. The printer PRT1 also distributes the modified print job JOB1 to the other printers PRT3 and PRT4 in a similar manner.

The printer PRT1 itself executes printing in the course of distribution. The printer PRT1 sums up the number of copies distributed to the other printers PRT2 through PRT4 and the number of copies printed by itself and manages the total number of printed copies, so as to eventually complete printing of the specified number of copies '100 copies'. The progress of printing is sequentially displayed on an operation panel OP.

Figure 2:
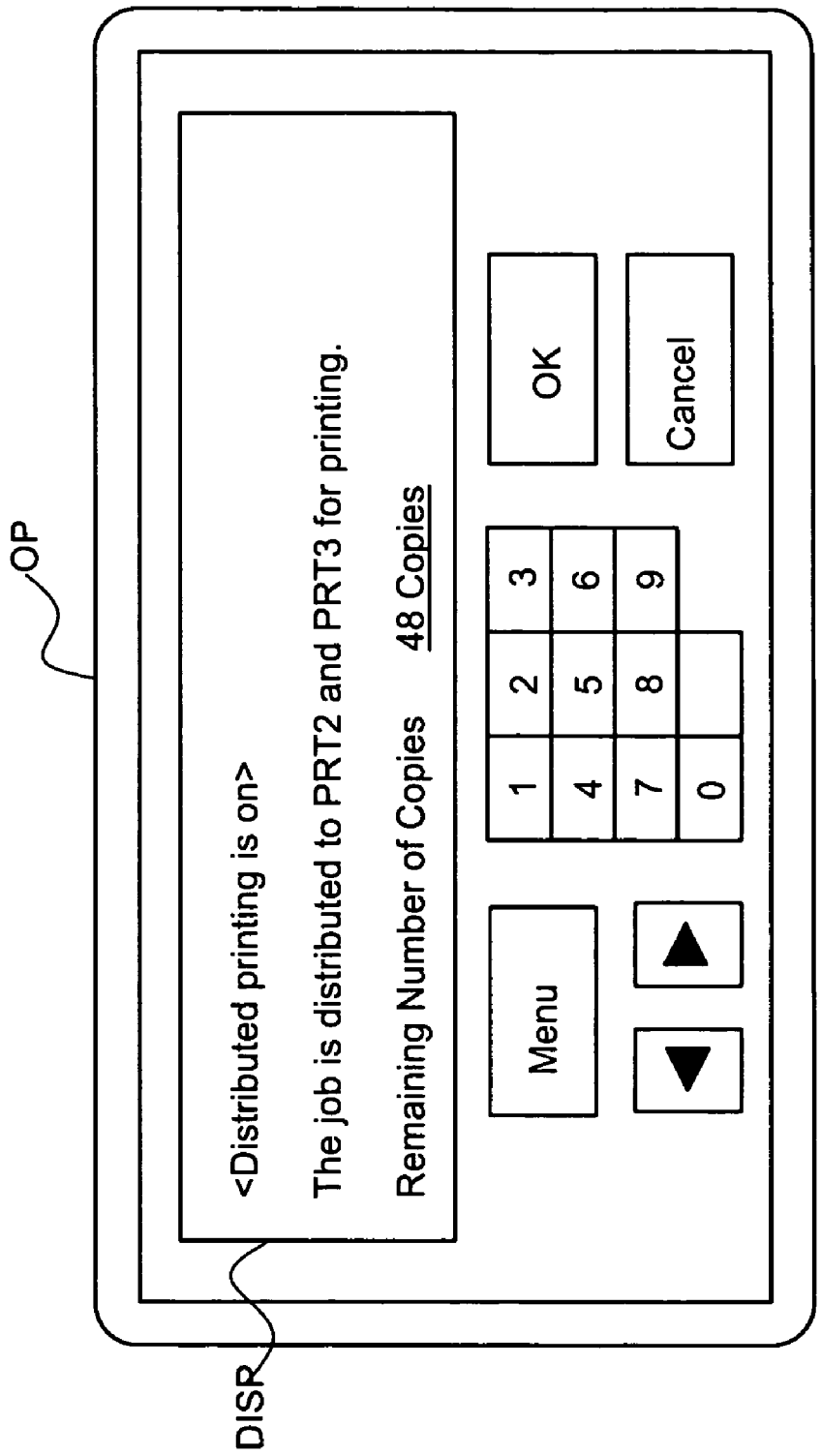
FIG. 2 shows one exemplified structure of an operation panel.

FIG. 2 shows one exemplified structure of the operation panel OP. The operation panel OP has a display DISP and several buttons. The display DISP is an LCD panel, on which various pieces of information including error messages and the current status of distributed printing are shown. In the process of distributed printing, the destinations of distribution and the remaining number of copies to be printed are shown on the display DISP.

A2. Functional Blocks of Printer

Figure 3:
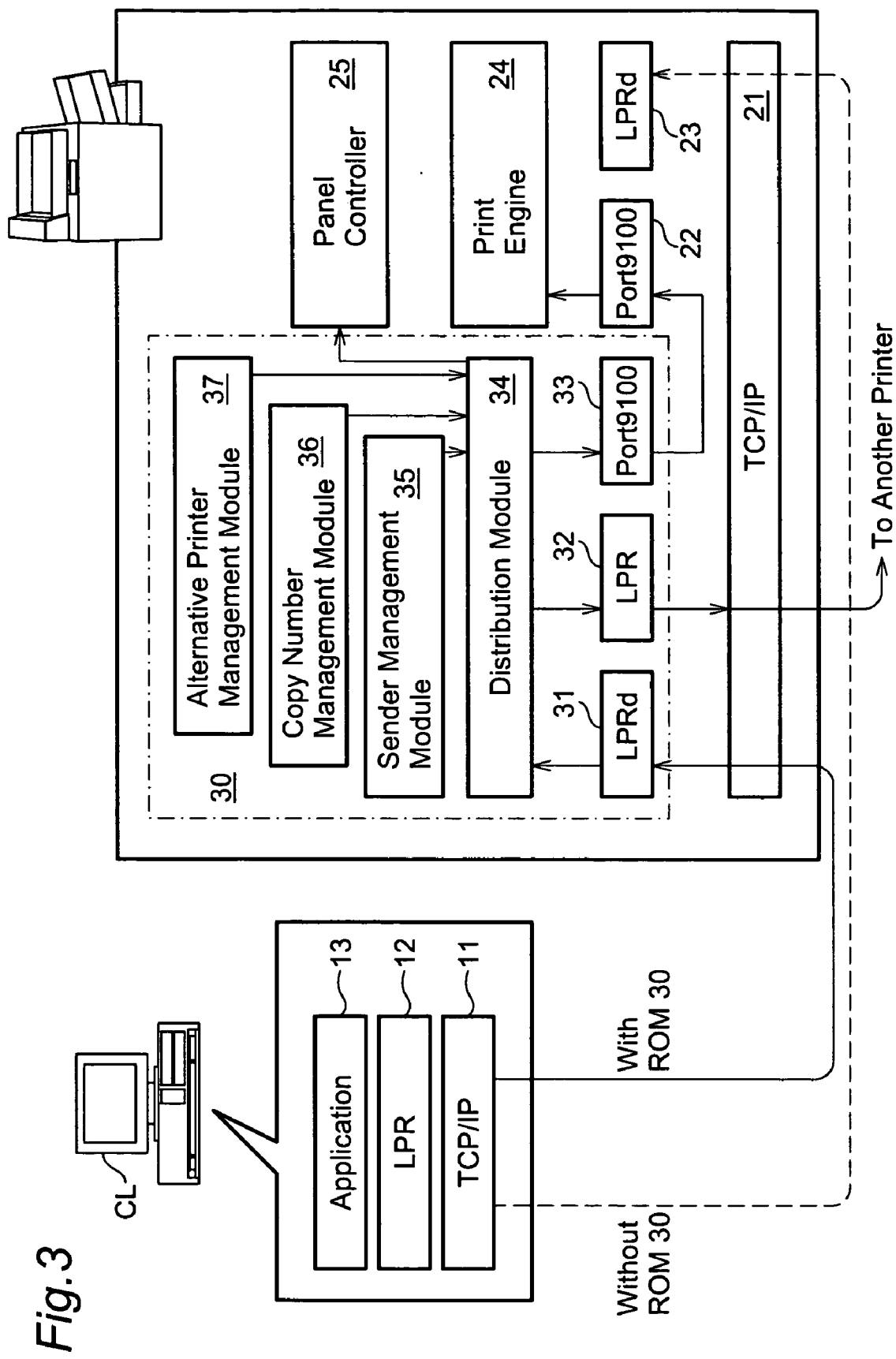
FIG. 3 is a block diagram showing functional blocks of a printer.

FIG. 3 is a block diagram showing functional blocks of the printer. The printer includes a control unit having a CPU and memories. The functional blocks illustrated in FIG. 3 are constructed as software modules executed by the control unit, although the respective functional blocks may be attained by hardware components.

Additional functions for attaining the distributed printing are shown separately from the intrinsic functions of the printer. The intrinsic functions of the printer include a TCP/IP 21, a Port 9100 interpretation module 22, an LPRd 23, a print engine 24, and a panel controller 25. The TCP/IP 21 interprets a TCP/IP and communicates with the outside of the printer via a network. The LPRd 23 interprets an LPR as a printing protocol. The Port 9100 interpretation module 22 interprets Port 9100 as a printing protocol. The print engine 24 controls the hardware components of the printer to execute each print job. The panel controller 25 controls the display to display the working state of the printer and receive the entry of the user's settings.

In the case where the printer has only the intrinsic functions, a print job is transferred to the printer for printing along a path shown by an arrow of dotted line. In response to a printing instruction given by the user, an application 13 incorporated in the client CL transmits a print job generated according to the printing protocol LPR to the printer via an LPR 12 and a TCP/IP 11. The TCP/IP 21 and the LPRd 23 included in the printer receive the transmitted print job, interprets the protocols, and transfers print data to the print engine 24.

Insertion of a ROM 30 with a program of the additional functions stored therein, into an extension slot of the printer actualizes the additional functions of distributed printing. The respective functional blocks of the additional functions work under control of a distribution module 34, which functions to control the distributed printing.

An alternative printer management module 37 retrieves and selects printers as destinations of distribution in the process of distributed printing. A copy number management module 36 manages the specified number of copies to be printed and the number of printed copies. The number of printed copies is the total of the number of copies printed by the printer itself and the number of copies printed by the other printers. A sender management module 35 manages the sender of a print job as an object of distributed printing. The sender may be a client, a printer, or any of other diverse devices. The sender management module 35 holds the IP address of the sender, an MAC address, and classification of the sender, for example, distinction between the client and the printer, until completion of each print job.

An LPRd 31 interprets the LPR and stops the intrinsic function LPRd 23. The print job sent from the client CL is accordingly received by the additional function LPRd 31 as shown by the arrow of solid line. The functions of the LPRd 31 enable the client CL to take advantage of distributed printing by simply sending a print job without being specifically conscious of the presence of the additional functions in the printer.

The LPR 32 functions to distribute the print job to the other printers according to the LPR protocol. The functions of the LPR 32 are similar to the functions of the LPR 12 included in the client CL. A Port 9100 transmission module 33 functions to transmit a print job according to the Port 9100 protocol. In the structure of this embodiment, the receiver of the print job is the Port 9100 interpretation module 22 intrinsically provided in the printer. This arrangement enables the printer itself to execute printing, while the intrinsic function LPRd 23 stops its functions.

The distribution module 34 may directly transfer the print data to the print engine 24 for execution of printing by the printer itself. The transfer of the print job according to the protocol on the network via the Port 9100, however, advantageously enables the additional functions included in the ROM 30 to be readily constructed in a device separate from the printer, for example, a print server or a home gateway.

In the structure of this embodiment, each printer (PRT1 through PRT4) has the ROM 30 discussed above. Insertion of the ROM 30 into only one printer on the network is theoretically sufficient to attain the distributed printing. The structure of the embodiment where all the printers have the ROM 30, however, desirably enhances the utility of the printing system, since the user may output a print job to any printer to take advantage of the distributed printing scheme.

A3. Distributed Printing Process

Figure 4:
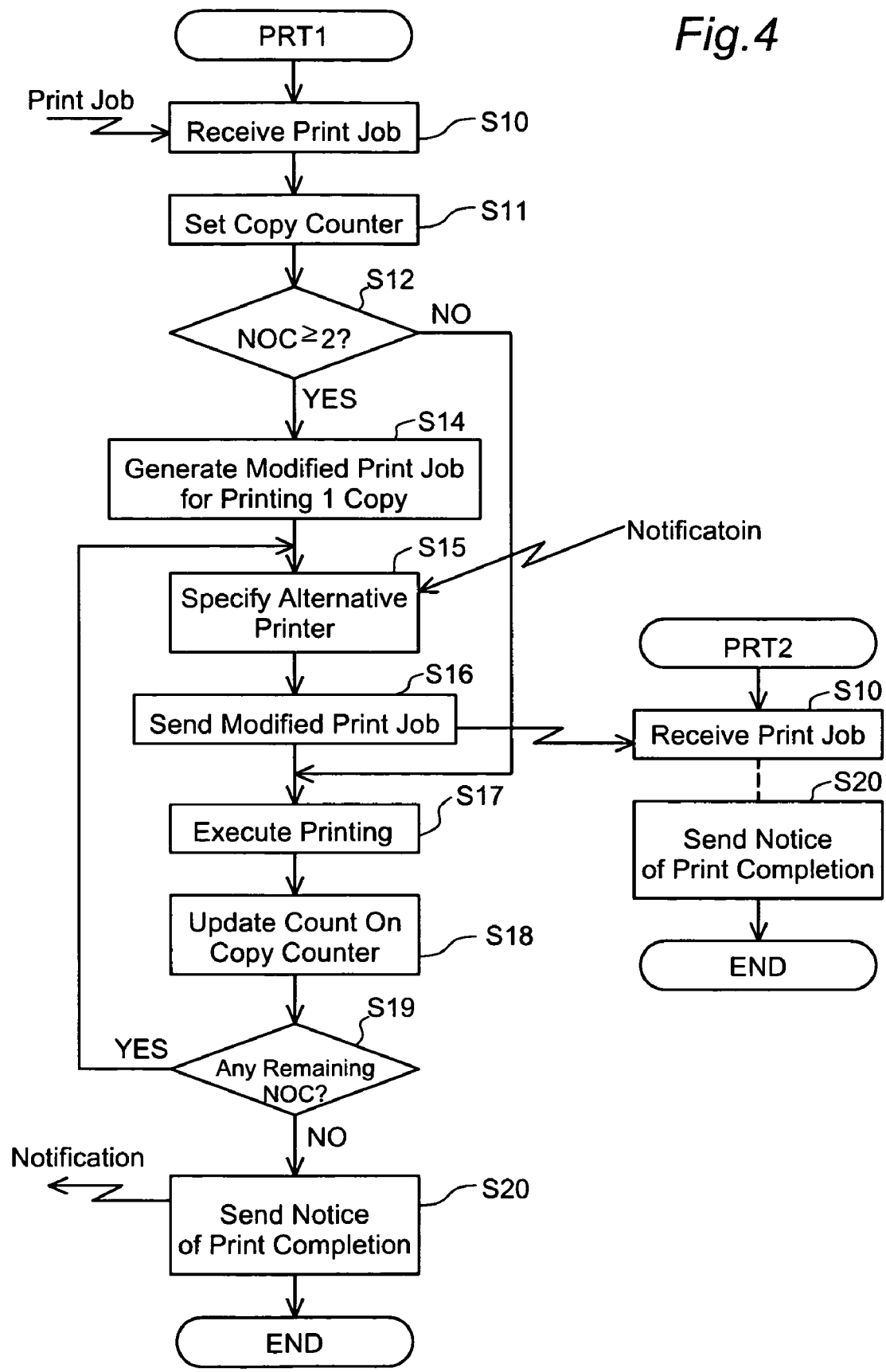
FIG. 4 is a flowchart showing a distributed printing routine executed in the first embodiment.

FIG. 4 is a flowchart showing a distributed printing routine, which is executed by the control unit of the printer. In the following discussion, it is assumed that the printer PRT1 receives a print job and distributes the print job to the printer PRT2.

The printer PRT1 receives a print job (step S10) and sets a specified number of copies in the received print job to a copy counter (step S11). The printer PRT1 also stores the information regarding the sender of the print job, for example, the IP address, for later notification of print completion.

When the specified number of copies is not less than 2 (step S12), the printer PRT1 carries out a distribution process discussed below. The printer PRT1 generates a modified print job, which is to be sent to another printer and to be executed by the printer PRT1 itself, by changing the specification of the number of copies to be printed to '1 copy' (step S14). The printer PRT1 then specifies an alternative printer as a destination of distribution (step S15) and sends the modified print job to the specified alternative printer (step S16). Here the alternative printer may be singular or plural. The processing of step S15 may be looped to find any alternative printer that is not receiving any other print job at the moment and can accept the modified print job. When no such an alternative printer is found, the routine may skip the step of sending the modified print job but proceed to the subsequent steps. The procedure of this embodiment repeatedly executes the processing of steps S15 through S19 as long as there is any remaining number of copies. The modified print job may thus be sent to the alternative printer every time the alternative printer is found.

The printer PRT1 itself executes printing in the meanwhile of this distribution process (step S17). When the specified number of copies is only '1 copy' (step S12), the printer PRT1 skips the above series of distribution process and immediately executes printing (step S17).

The printer PRT1 updates the count on the copy counter (step S17) with progress in transmission of the print job and execution of printing. The updating process subtracts the number of copies distributed to other printers and the number of copies printed by itself from the previous count on the copy counter. For example, in the case of no distribution of the print job to any alternative printers, the number of copy(NOC) '1' printed by the printer PRT1 itself is subtracted from the previous count on the copy counter. In the case of distribution of the print job (printing '1 copy') to three alternative printers, the total number of copies '4' as the sum of the '3 copies' distributed to the alternative printers and the '1 copy' printed by the printer PRT1 itself, is subtracted from the previous count on the copy counter. At the moment when a print job is sent to an alternative printer, the procedure of the embodiment determines completion of the print job and updates the count on the copy counter. A modified procedure may update the count on the copy counter at the moment when a notice of print completion is received from the alternative printer.

The printer PRT1 repeatedly executes the series of processing discussed above, until it is determined that there is no remaining number of copies, based on the count on the copy counter (step S19). On completion of printing, a notice of print completion is sent to the sender of the original print job (step S20).

The value '1 copy' is set to the number of copies in the modified print job sent to the printer PRT2. The printer PRT2 specified as the alternative printer receives the modified print job (step S10) and executes printing without distributing the print job to any other printers. On completion of printing, a notice of print completion is sent to the printer PRT1 as the sender of the modified print job (step S20).

Figure 5:
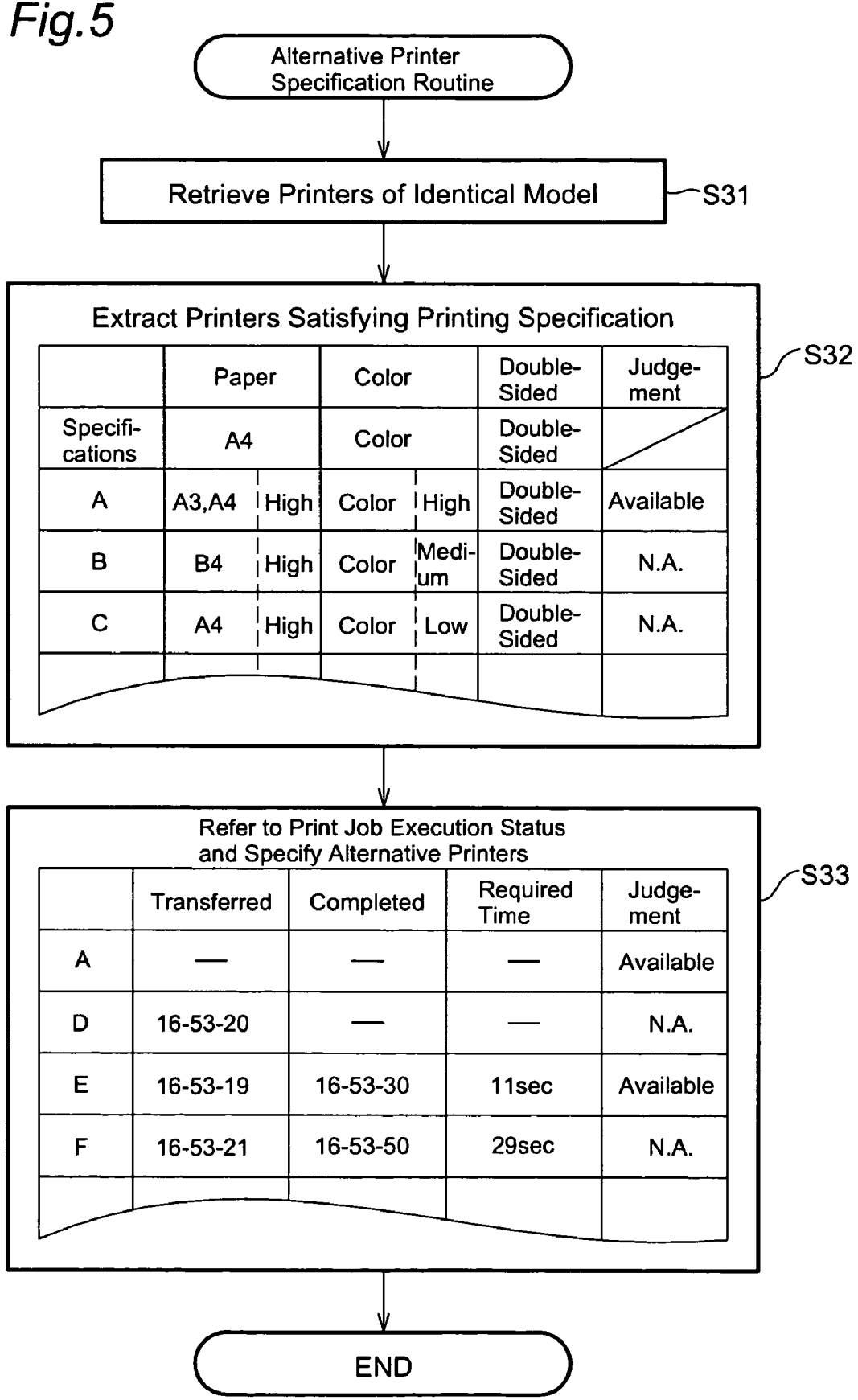
FIG. 5 is a flowchart showing an alternative printer specification routine executed in the first embodiment.

FIG. 5 is a flowchart showing an alternative printer specification routine, which is executed by the control unit of the printer PRT1. This routine shows the details of the process of specifying the alternative printer at step S15 in the flowchart of FIG. 4.

The printer PRT1 first retrieves printers of the identical model on the network (step S31). The retrieval process may utilize an SNMP protocol to send inquiries about the model to each printer on the network by broadcast. Any of various restrictions may be imposed on the retrieval. For example, the restriction may be given to retrieve printers having IP addresses in a specified range close to the printer PRT1. Alternatively the user may specify a printer as a destination of distribution by utilizing a user interface incorporated in the printer or a Web page provided by the printer.

The printer PRT1 subsequently extracts printers that satisfy printing specifications specified in the print job among the retrieved printers (step S32). One example of printing specifications is shown in FIG. 5. The printing specifications include, for example, available sizes of printing paper, availability of color/monochromatic printing, and availability of double-sided printing. The extraction process may also utilize the SNMP protocol to make inquiries about specifications of each printer. The procedure of this embodiment also inquires the remaining amounts of consumables, that is, printing paper and ink.

In the illustrated example, the printing specifications specified in the print job are printing paper of size A4, color printing, and double-sided printing. The results of inquiries sent back from retrieved printers A, B, and C are shown as an example. The printer A is available for printing on the size A3 and size A4 printing papers, color printing, and double-sided printing and has the 'high level' as both the remaining amounts of printing paper and ink. The printer A thus satisfies all the printing specifications and is judged as 'Available'.

The printer B is available for printing on only the size B4 printing papers and thus does not satisfy the printing specifications. The printer C has the 'low level' as the remaining amount of ink and thus does not satisfy the printing specifications. These printers B and C are accordingly judged as N.A. (Not Available).

The level of the remaining amount of each consumable may be evaluated by comparison with a preset reference value or by taking into account the printing specifications specified in the print job. For example, when the print job specifies printing of 100 copies, 100 sheets of printing paper may be set to the reference value to evaluate the level of the remaining quantity of printing paper. The level of the remaining amount of ink may be evaluated, for example, by calculating an expected consumption of ink on the basis of the amount of print data. The printers may be extracted without considering the remaining amounts of the consumables. The arrangement of the embodiment that takes account of the remaining amounts of the consumables advantageously prevents a potential interruption of printing, due to the insufficient consumable. This is especially preferable in the case of printing a large number of copies, since the interruption of printing may lead to confusion of the total number of printed copies.

In order to avoid overlap distribution of a print job to the printer that has already received another print job, the printer PRT1 refers to a print job execution status with regard to each of the printers extracted as possible options and specifies one or multiple alternative printers (step S33). Evaluation results of the print job execution status are also shown in FIG. 5. In this illustrated examples, four printers A, D, E, and F are possible options of the alternative printer. The printer A has not yet received a print job and is thus judged as 'Available' as an alternative printer. The printer D has a print job, which was transferred at 16:53'20" and has not yet been completed, and is thus judged as 'N.A.'

Each of the printers E and F has a print job, which was transferred and has already been completed, and is set in a print job transferable state. The printer E has a shorter time, 11 seconds, required for execution of the print job, while the printer F has a longer required time, 29 seconds. The printer PRT1 accordingly judges the printer E of the shorter required time as 'Available' and the printer F of the longer required time as 'N.A.' An arbitrary value may be set to a reference time used as the criterion of judgment of 'Available'/'N.A.' For example, when the reference time is set equal to 30 seconds, both the printers E and F are judged as 'Available'. The procedure of this embodiment uses the time required for printing by the printer PRT1 itself as the reference time. Such setting causes a print job to be transferred only when transfer of the print job shortens the overall required time to be less than the time required for printing by the printer PRT1 itself.

The alternative printers are specified according to the procedure discussed above. Part of the diverse conditions discussed above for specification of the alternative printers may be omitted according to the requirements. One modified procedure may omit the processing of step S31 and include printers of different models as possible options of the alternative printer. The identical model set as the condition of the retrieval is advantageous, however, since the identical model does not require any conversion of the print data included in the print job for printing and is free from any potential trouble due to a difference in font, thus ensuring uniform printing results.

The evaluation based on the required time for printing may be replaced by evaluation based on the communication speed in the network. The communication speed of each printer is evaluated from a response time according to the SNMP protocol or a response time to a 'ping' command. Only printers that are communicable at the communication speed of or over a preset level are selected as the alternative printers. This arrangement ensures quick transfer of the print job and desirably shortens the overall required time.

Figure 6:
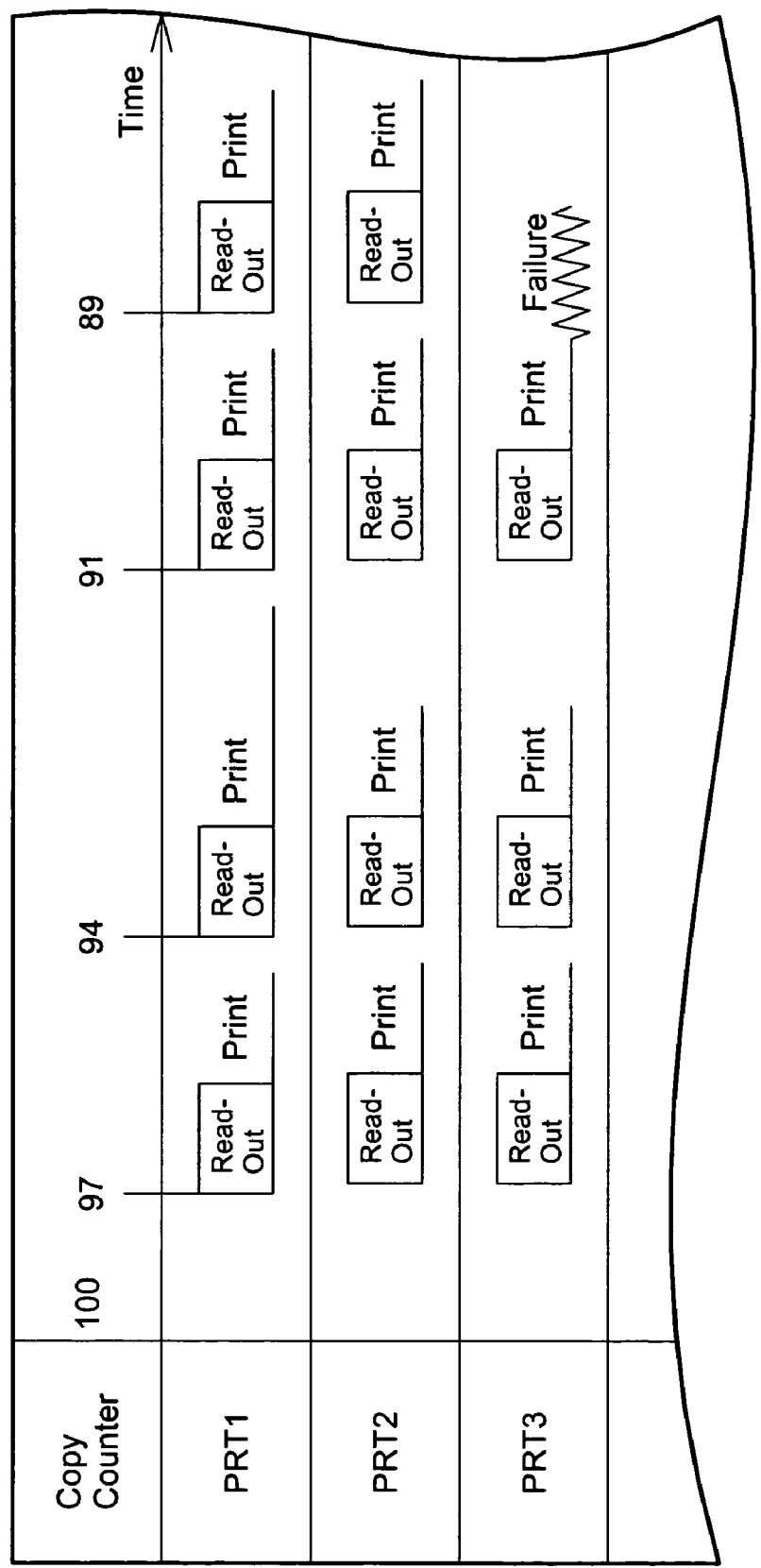
FIG. 6 shows a working example of distributed printing in the first embodiment.

FIG. 6 shows a working example of distributed printing. In this working example, the printer PRT1 accepts a print job to print 100 copies and executes printing while partly distributing the print job to the printers PR2 and PR3.

As illustrated, when the printer PRT1 accepts the print job, the count on the copy counter is set equal to 100 copies. The printer PRT1 itself reads the data of the print job and executes printing, while synchronously distributing the print job to the printers PRT2 and PRT3. At this moment, it is assumed that printing of 3 copies has been completed. The count on the copy counter is thus reduced to 97 copies.

On completion of printing by the printer PRT1, the printer PRT1 carries out a next cycle of printing and distribution. At this moment, the count on the copy counter is further reduced to 94 copies. In the structure of this embodiment, distribution of the print job is performed synchronously with a start of printing by the printer PRT1. A next cycle of distribution of the print job accordingly starts only after printing by the printer PRT1 is concluded, even when printing by the printers PRT2 and PRT3 has already been completed.

On completion of printing by the printer PRT1, the printer PRT1 carries out a third cycle of printing and distribution. At this moment, the count on the copy counter is further reduced to 91 copies. If there is any failure arising in the printer PRT3 in this cycle of distribution, no notice of print completion is sent from the printer PRT3. The printer PRT3 is here excluded from the option of the alternative printer. The printer PRT1 thus distributes the print job only to the printer PRT2 in a fourth cycle of printing and distribution. When the failure of the printer PRT3 is eliminated in the course of printing the residual copies, the printer PRT3 is restored to the option of the alternative printer to which the print job is distributable.

This procedure assumes that printing is completed at the moment when the print job is distributed, and updates the count on the copy counter. In the case of a failure arising after distribution of the print job, there may be an error on the total number of completed copies. This error is, however, distinct and the user can readily recognize the error and reissue the print job to print a required number of copies corresponding to the error. Otherwise the user may temporarily stop the process of distributed printing and manually change the count on the copy counter. Another applicable method may update the count on the copy counter after receiving a notice of print completion. Still another applicable method may give an instruction of printing a marginal number of copies to implement printing of at least the specified number of copies.

The procedure of this embodiment carries out distribution of the print job synchronously with execution of printing by the printer PRT1. This arrangement enables the printer PRT1 to efficiently distribute the print job to the alternative printers, while reading out the print job for printing. This arrangement also assures retrieval of the alternative printers and management of the number of copies printed without interfering with execution of printing by the printer PRT1. The distribution timing is not restricted to the timing discussed in the embodiment. Another applicable method may activate each cycle of printing and distribution based on reception of a notice of print completion from each alternative printer, regardless of the execution timing of printing by the printer PRT1.

A4. Packet Transmission

Figure 7:
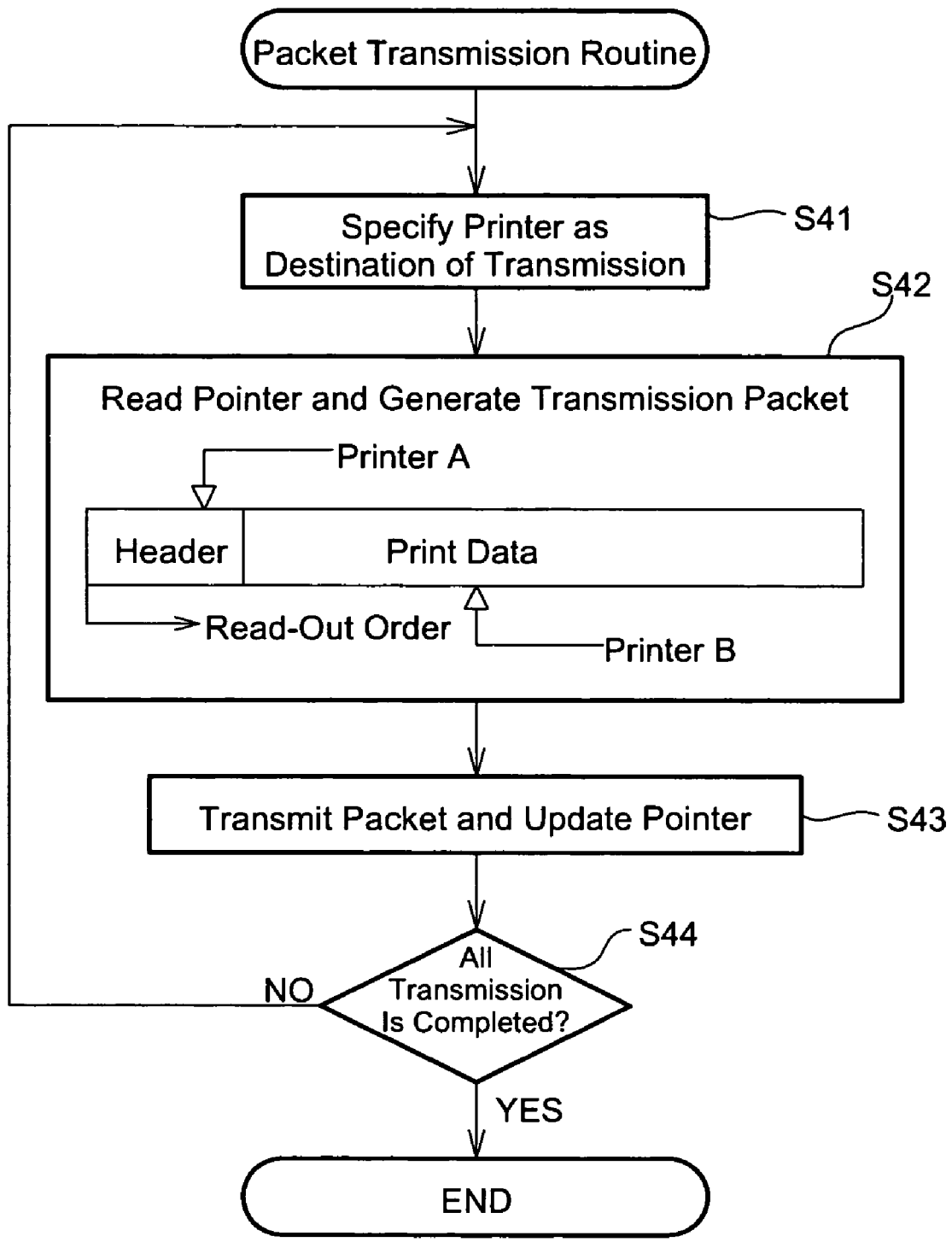
FIG. 7 is a flowchart showing a packet transmission routine executed in the first embodiment.

FIG. 7 is a flowchart showing a packet transmission routine to distribute a print job in packet units to multiple alternative printers. This corresponds to the processing of step S16 in the flowchart of FIG. 4. In the description below, the printer PRT1, which is the distribution source of the print job, executes this packet transmission routine.

The printer PRT1 specifies a printer as a destination of transmission among the alternative printers (step S41), and reads a pointer corresponding to the specified printer and generates a transmission packet (step S42). The concept of the pointer is shown in FIG. 7. The print job has a header and print data, and is successively read out from the top, is divided into packets of a predetermined unit, and is transmitted. The pointer indicates the position of data transmitted. Open triangles represent pointers corresponding to two alternative printers A and B. There is a difference in communication speed between the two alternative printers A and B, so that the respective printers A and B have different pointer positions. The procedure of this embodiment provides an individual pointer corresponding to each alternative printer. This arrangement allows for quicker transmission of the print job to the printer B having the higher communication speed without the rate control by the printer A having the lower communication speed.

The printer PRT1 transmits the packet to the specified printer and updates the pointer (step S43). The above series of processing is repeatedly executed until transmission of the print job to all the alternative printers is completed (step S44).

The packet transmission process discussed above may be replaced by a process of duplicating the print job by the number of the specified alternative printers and transmitting the duplicates of the print job to the respective alternative printers in a one-to-one mapping. When the memory capacity has a sufficient margin, this relatively simple control ensures efficient distribution of the print job.

As described above, the simply constructed system of the first embodiment attains distributed printing with multiple printers. This system conveniently attains distributed printing only by requiring the user to output the print job to one of the printers, like the procedure of general printing.

The procedure of the first embodiment repeats the cycle of printing and transmission of the print job to the alternative printers until printing of the specified number of copies is completed (steps S15 through S17 in the flowchart of FIG. 4). One possible modification may add the function of keeping a print job until input of an erase instruction to each alternative printer that is capable of spooling the print job. This arrangement readily attains distributed printing by simple repeated output of a printing instruction of the print job spooled in each alternative printer after transmission of the print job in the first cycle.

B. Second Embodiment

The procedure of the first embodiment specifies the alternative printers by taking into account the printing specifications and the print job execution status (see FIG. 5). The procedure of a second embodiment additionally regulates the numbers of copies to be distributed to the alternative printers by taking into account the residual operating lives of the respective printer.

Figure 8:
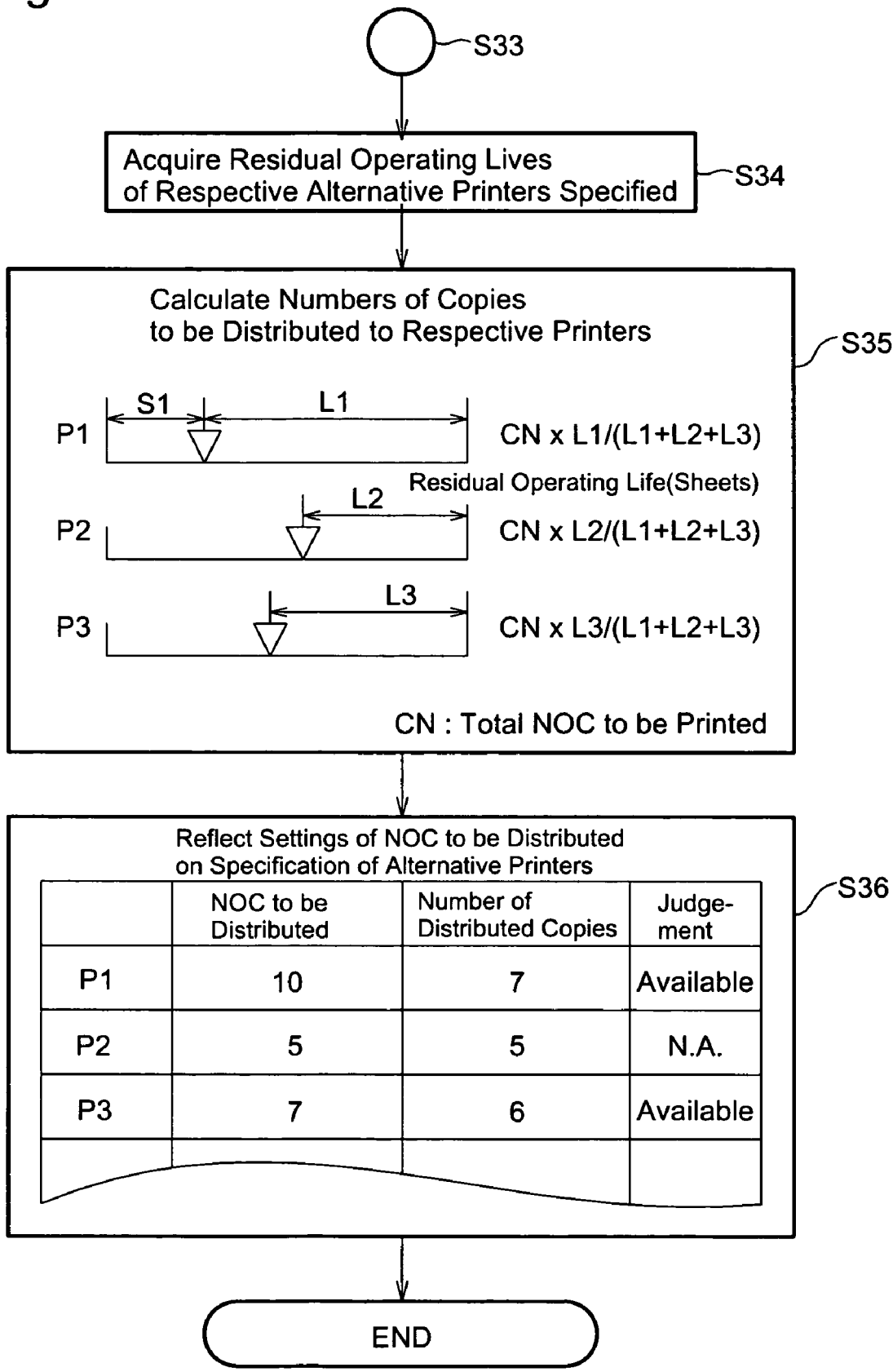
FIG. 8 is a flowchart showing an alternative printer specification routine executed in a second embodiment of the invention.

FIG. 8 is a flowchart showing an alternative printer specification routine executed in the second embodiment. This follows the processing of the first embodiment shown in the flowchart of FIG. 5. In the description below, the printer RPT1, which takes charge of distributing the print job, executes this series of processing in the second embodiment, as in the case of the first embodiment.

The printer PRT1 acquires the residual operating life of each alternative printer specified (step S34). The process may utilize the SNMP protocol to send inquiries about the residual operating life to the respective alternative printers. The residual operating life of the printer is typically expressed by the remaining amount of toner, the residual operating life of a photosensitive drum (calculated as the printable number of sheets), the operating life of a transfer belt, the remaining number of sheets, or any combination thereof. In the following description, among these factors, the 'operating life of the photosensitive drum', which is approximate to the operating life of the printer engine, is used to express the residual operating life of the printer. Another factor may naturally be used to express the residual operating life of the printer.

The printer PRT1 subsequently calculates the numbers of copies to be distributed to the respective printers, based on the acquired data of the residual operating life (step S35). The method of calculation is shown in FIG. 8. The numbers of copies to be distributed to the respective printers are determined corresponding to the ratio of the residual operating lives. In the illustrated example, a printer P1 has a residual operating life L1 (sheets). When a printed number of sheets S1 is obtained according to the SNMP protocol, the residual operating life L1 (sheets) may be specified by subtracting the printed number of sheets S1 from the whole operating life (sheets). Printers P2 and P3 respectively have residual operating lives L2 and L3.

The numbers of copies to be distributed to the respective printers are determined as below corresponding to the ratio of the residual operating lives:

Number of Copies to be Distributed to Printer P1=CN×L1/(L1+L2+L3)

Number of Copies to be Distributed to Printer P2=CN×L2/(L1+L2+L3)

Number of Copies to be Distributed to Printer P3=CN×L3/(L1+L2+L3)

where CN represents the total number of copies to be printed.

The printer PRT1 sets the numbers of copies to be distributed to the respective printers by taking into account the residual operating life of the printer PRT itself and the residual operating lives of the alternative printers according to the above equations.

The printer PRT1 then adjusts specification of the alternative printers by reflecting the settings of the numbers of copies to be distributed (step S36). When a printer has already received distribution of a certain number of copies, which is equal to or greater than the setting of the number of copies to be distributed, the printer is excluded from the specification of the alternative printer. One example of the settings of the numbers of copies to be distributed is also shown in FIG. 8. In the illustrated example, the numbers of copies distributed to the printers P1 and P3 are less than the respective settings of the numbers of copies to be distributed. The printers P1 and P3 are accordingly judged as 'Available'. The number of copies distributed to the printer P2 has, on the other hand, already reached the setting of the number of copies to be distributed. The printer P2 is thus judged as 'N.A.'

As described above, the procedure of the second embodiment regulates the numbers of copies to be distributed to the respective printers by taking into account the residual operating lives of the printers. This arrangement desirably controls the end timing of the operating life of each printer, for example, to make multiple printers come to the end of their operating lives at substantially simultaneous timings. This reduces the frequency of required maintenance of the respective printers and allows substantially all the printers to be used up to their operating lives, thus facilitating an update plan of the printers used in the printing system.

B1. Modified Example of Second Embodiment

Figure 9:
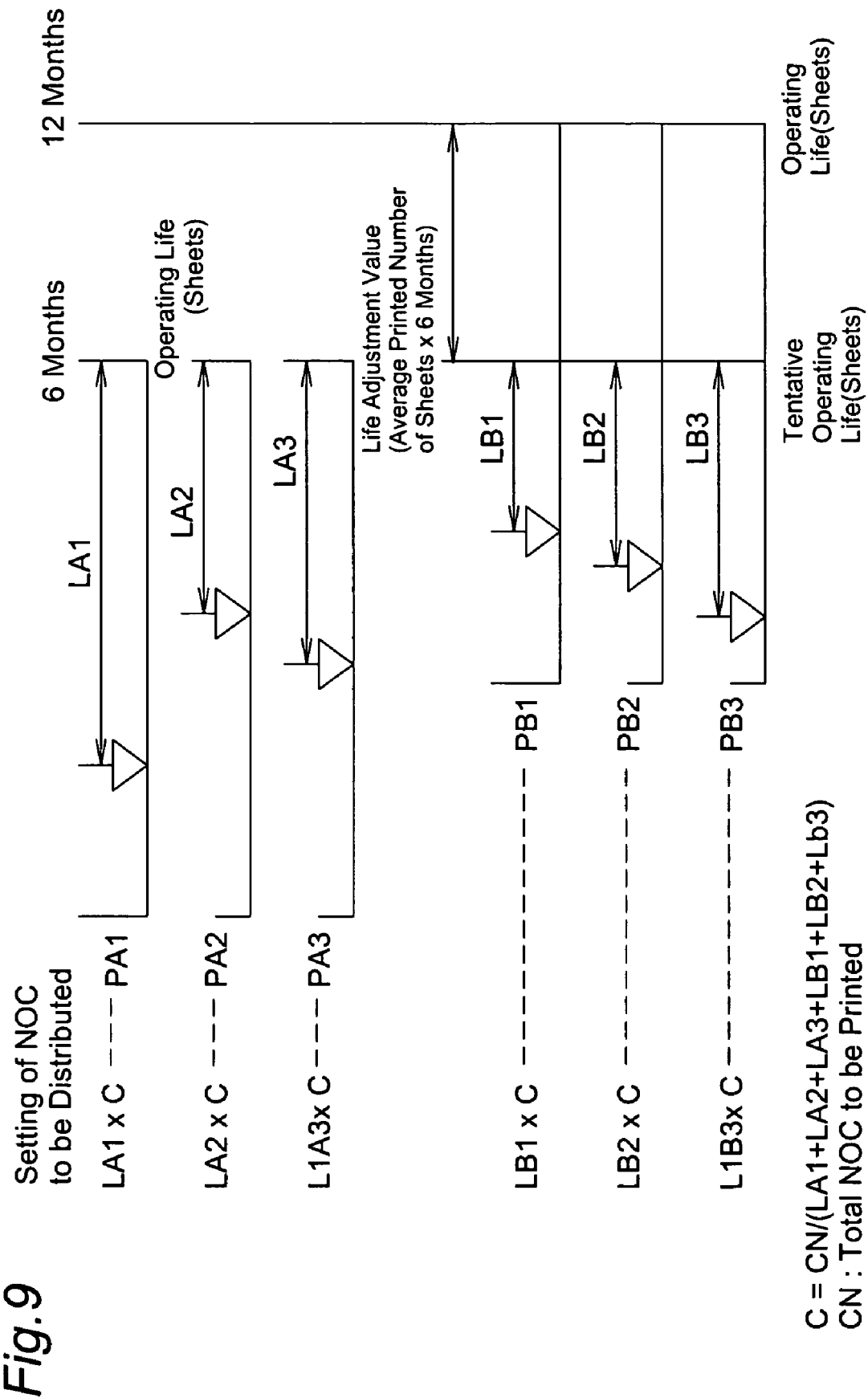
FIG. 9 shows a process of setting distribution numbers in one modified example of the second embodiment.

FIG. 9 shows a process of setting the numbers of copies to be distributed to the respective printers in one modified example of the second embodiment. This procedure classifies printers into two groups and sets the numbers of copies to be distributed to the respective printers to shift the end timing of the operating life in one group from the end timing of the operating life in the other group.

In the illustrated example, three printers PA1 through PA3 are planned to come to the end of their operating life in June, whereas the other three printers PB1 through PB3 are planned to come to the end of their operating life in 6 months later, that is, in December. The procedure of this modified example sets tentative operating lives to either of the two groups, so as to adjust the difference in end timing of the operating life between the two groups.

In the illustrated example, on June when the printers PA1 through PA3 come to the end of their operating life, the printers PB1 through PB3 are supposed to still have the residual operating life of 6 months. The residual operating life of each printer is convertible into a printable number of sheets by the printer, for example, as a calculation of 'the average printed number of sheets×6 months'. The procedure subtracts a life adjustment value specified by the above calculation from the originally expected operating lives of the respective printers PB1 through PB3 and sets the differences as tentative operating lives of the respective printers PB1 through PB3.

The procedure then specifies tentative residual operating lives LB1 through LB3 of the printers PB1 through PB3 on the basis of the respective tentative operating lives. The procedure specifies residual operating lives LA1 through LA3 on the basis of their originally expected operating lives.

After specifying the residual operating lives of the respective printers, the procedure of the modified example sets the numbers of copies to be distributed to the respective printers, based on the ratio of their residual operating lives, in the same manner as the procedure of the second embodiment. The illustrated example also shows the settings of the numbers of copies to be distributed to the respective printers, when the total number of copies to be printed is equal to CN.

The procedure of the modified example desirably prevents all the printers from coming to the end of their operating life simultaneously and thus allows for replacement of the used-up printers coming to the end of their operating life, while operating the other printers. This modified example shifts the operating life in units of the group, but is also applicable to control the end timing of the operating life of each printer.

C. Third Embodiment

Figure 10:
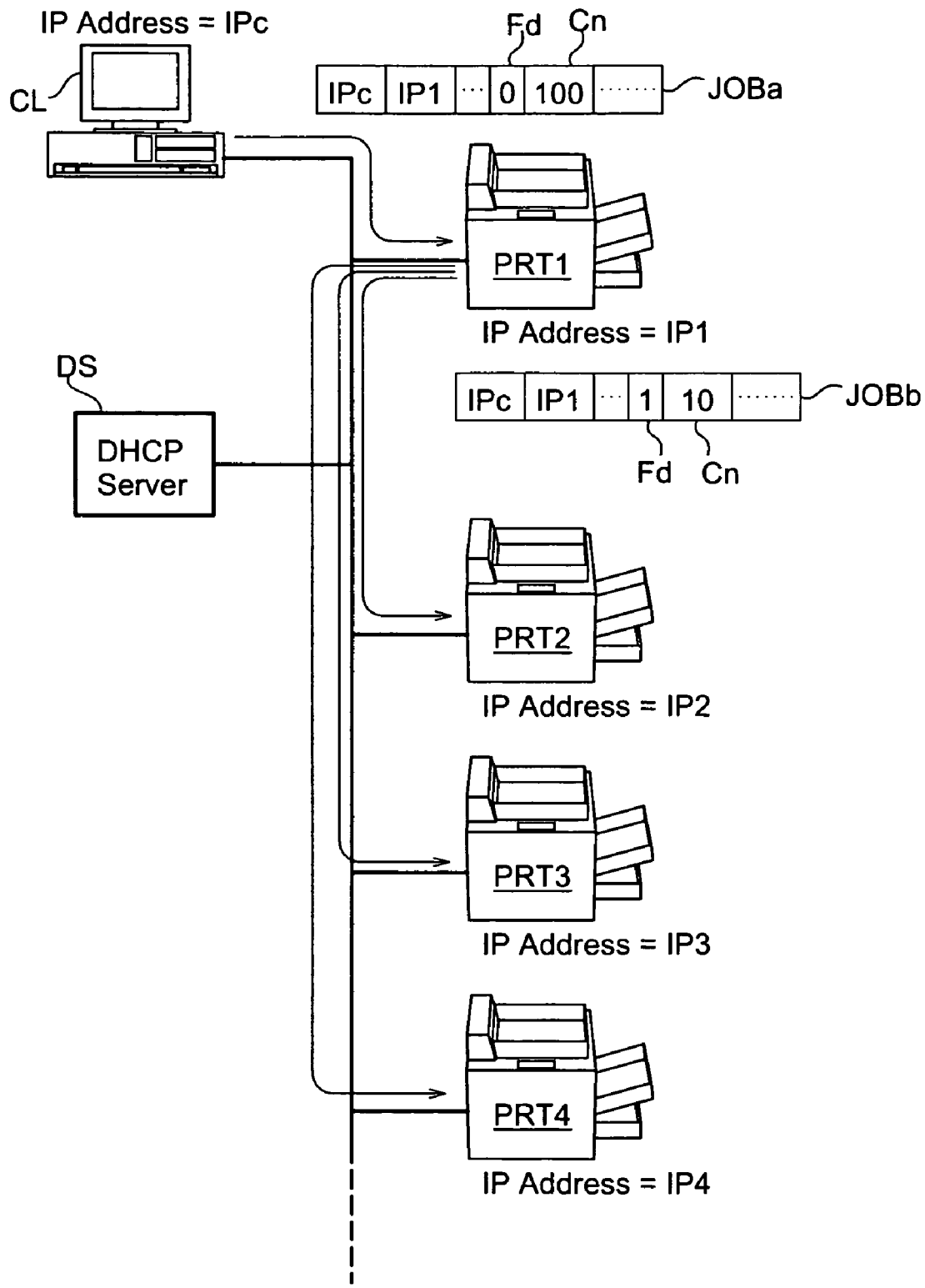
FIG. 10 shows a flow of distributed printing in a third embodiment of the invention.

FIG. 10 shows a flow of distributed printing in a third embodiment of the invention. The procedures of the first embodiment and the second embodiment distribute the modified print job including the number of copies set to '1 copy' to the alternative printers. The procedure of the third embodiment sets a plural number of copies in a modified print job to be transferred to the alternative printers.

In this illustrated example, the client CL sends a print job JOBa to the printer PRT1. The print job of the third embodiment has a distribution control flag Fd, in addition to specification data Cn regarding a number of copies to be printed. The distribution control flag Fd is set either equal to '0', which represents permission of distribution to another printer, or equal to '1', which represents prohibition of distribution to another printer.

The distribution control flag Fd included in the received print job JOBa is set equal to '0', so that the printer PRT1 distributes the print job JOBa to alternative printers PRT2 through PRT4. The printer PRT1 subsections the specified number of copies to be printed Cn='100 copies' and generates a modified print job JOBb including specification of the number of copies to be printed as '10 copies'. The distribution control flag Fd included in the modified print job JOBb is set equal to '1' to prohibit redistribution of the print job JOBb.

The printer PRT1 distributes the modified print job JOBb thus generated to the respective alternative printers PRT2 through PRT4. One possible application may change the setting of the number of copies to be printed by each printer. Each of the printers PRT2 through PRT4 receives the print job JOBb and executes printing. Since further distribution is prohibited, each of the printers PRT2 through PRT4 does not distribute the print job JOBb, which includes specification of the plural number of copies to be printed, to any other printers.

The control procedure of this embodiment is attained by replacing the condition of step S12 in the distributed printing routine (FIG. 4) with conditions of 'the distributed control flag=0 and the specified number of copies to be printed is not less than 2 copies'. When these conditions are satisfied, the processing of steps S14 through S16 is carried out to distribute the print job to the alternative printers. Otherwise the procedure skips the processing of steps S14 through S16 to prohibit the distribution and immediately proceeds to step S17.

The procedure of the third embodiment causes each alternative printer to print a plural number of copies and thus relieves the traffic for transmission of the print job. The procedure of the third embodiment also uses the distribution control flag to specify permission or prohibition of distribution. This arrangement effectively prevents each the alternative printers that has received distribution of the print job from redistributing the print job to the other alternative printers without limitations, for example, redistribution of the print job from the printer PRT2 to the printer PRT3.

D. Fourth Embodiment

Figure 11:
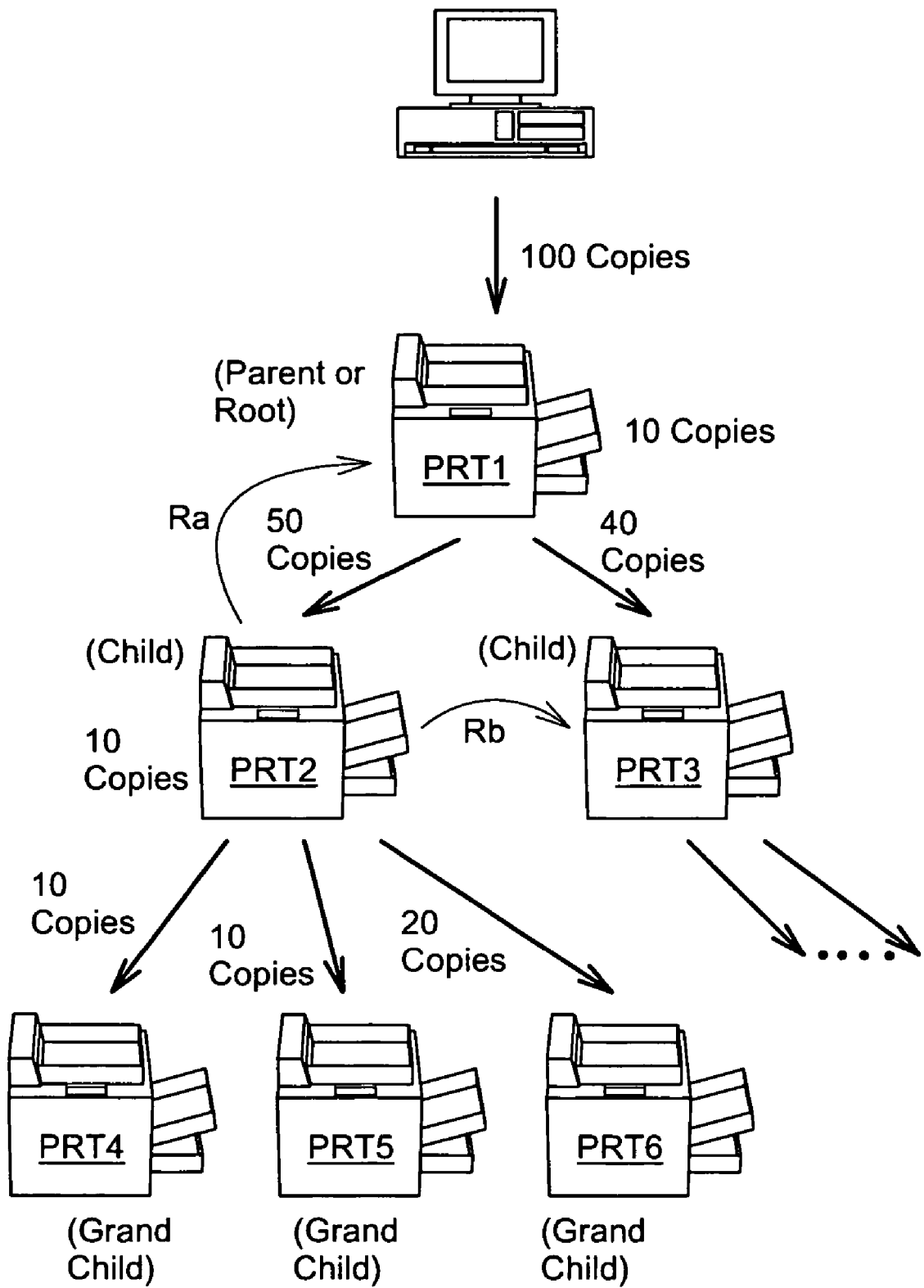
FIG. 11 shows a flow of distributed printing in a fourth embodiment of the invention.

FIG. 11 shows a flow of distributed printing in a fourth embodiment of the invention. The system of this embodiment successively distributes a print job to printers connecting via a network in a chain-reaction manner.

The printer PRT1 receives a print job including specification of the number of copies to be printed='100 copies' from a client. The printer PRT1 distributes the received print job to an alternative printer PRT2 with specification of 50 copies and to another alternative printer PRT3 with specification of 40 copies, while printing 10 copies by itself. Neither of the printers PRT2 and PRT3 is prohibited from redistributing the distributed print job.

Each of the printers PRT2 and PRT3 has received the distributed print job including specification of a plural number of copies to be printed and retrieves alternative printers for redistribution of the distributed print job. In the illustrated example, the printer PRT2 redistributes the print job to alternative printers PRT4 and PRT5 with specification of 10 copies and to another alternative printer PRT6 with specification of 20 copies, while printing 10 copies by itself.

For convenience of explanation, the printer PRT1 that has received the print job from the client is referred to as 'parent' or 'root'. The printers PRT2 and PRT3 that have received distribution of the print job from the parent printer are referred to as 'child'. The printers PRT4 through PRT6 that have received distribution of the print job from the child printer are referred to as 'grandchild'. In the case of hierarchical distribution of the print job, it is required to avoid overlap distribution of a print job to the printer that has already received a distributed print job, for example, reverse distribution from the child to the parent as shown by an arrow Ra in FIG. 11 or redistribution between the children as shown by an arrow Rb. The procedure of the fourth embodiment adopts the technique discussed below to avoid such overlap distribution.

Figure 12:
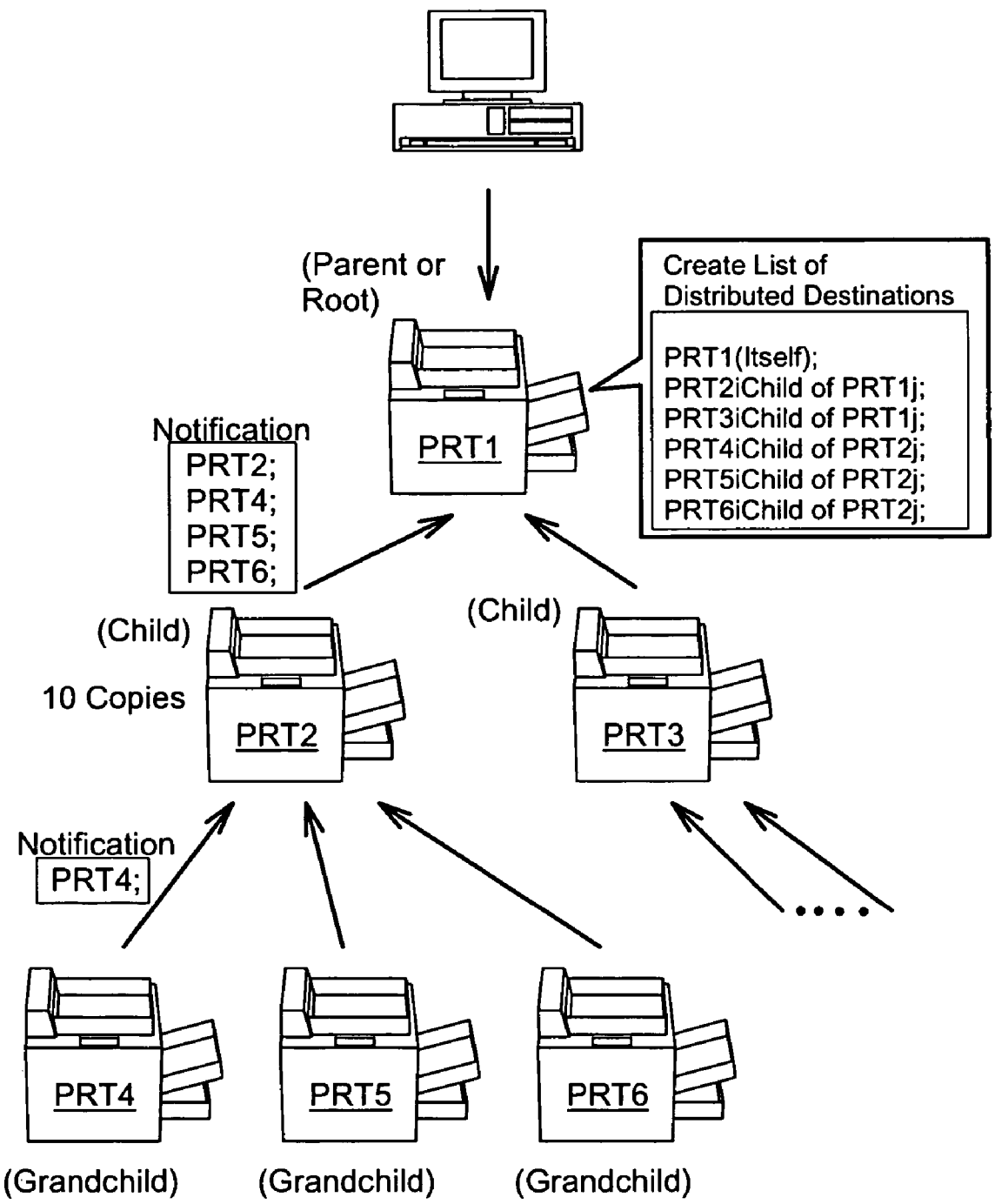
FIG. 12 shows a process of avoiding overlap distribution of print jobs in the fourth embodiment.

FIG. 12 shows a method of avoiding overlap distribution of print jobs. Each printer has the function of notifying a printer on the upper hierarchy of one or multiple printers that execute the received print job (hereafter referred to as 'notice of distribution destination'). The printer on the upper hierarchy represents the printer that has sent the received print job. A parent printer that has originally received the print job from the client does not give the notice of distribution destination.

According to this function, the grandchild printer PRT4, which does not carry out any further distribution to other printers, sends a notice of distribution destination as 'printer PRT4' to the child printer PRT2 on the upper hierarchy. In a similar manner, the grandchild printers PRT5 and PRT6 send notices of distribution destination to the child printer PRT2.

The child printer PRT2 receives the notices of distribution destination from the grandchild printers PRT4 through PRT6, adds the child printer itself PRT2 as the distribution destination, and transmits a notice of distribution destination representing 'PRT2, PRT4, PRT5, and PRT6' to the parent printer PRT1. In a similar manner, the child printer PRT3 sends a notice of distribution destination to the printer PRT1.

Successive transmission of the notice of destination distribution from the printer on the lowest hierarchy to the root enables the parent printer PRT1 to be informed of all the printers that have received distributions of the print job. The printer PRT1 creates a list of distribution destinations, based on the received information. As shown in FIG. 12, the list of distribution destinations may include information regarding the parent-child relation. Each printer receives a report on the number of printed copies from its direct child.

In the system of the fourth embodiment, each printer refers to the list of distribution destinations created by the parent printer PRT1, excludes the printers included in the list from the possible options, and specifies alternative printers as destinations of distribution. One concrete procedure may carry out retrieval with exclusion of the printers included in the list of distribution destinations at step S31 in the flowchart of FIG. 31 discussed in the first embodiment.

The procedure of the fourth embodiment distributes a print job, which includes specification of a plural number of copies to be printed, to alternative printers, while avoiding overlap distribution. This arrangement effectively relieves the load of the parent printer in management of the number of copies and attains efficient distributed printing.

In the structure of the fourth embodiment, each printer refers to the list of distribution destinations created by the parent printer. In one possible modification, the parent printer may deliver the list of distribution destinations to the respective printers. For example, every time the list of distribution destinations is updated, the parent printer delivers the updated list of distribution destinations to the respective printers by broadcast or by multicast.

The embodiments discussed above are to be considered in all aspects as illustrative and not restrictive. There may be many modifications, changes, and alterations without departing from the scope or spirit of the main characteristics of the present invention.

E. Fifth Embodiment

E1. Outline of System

Figure 13:
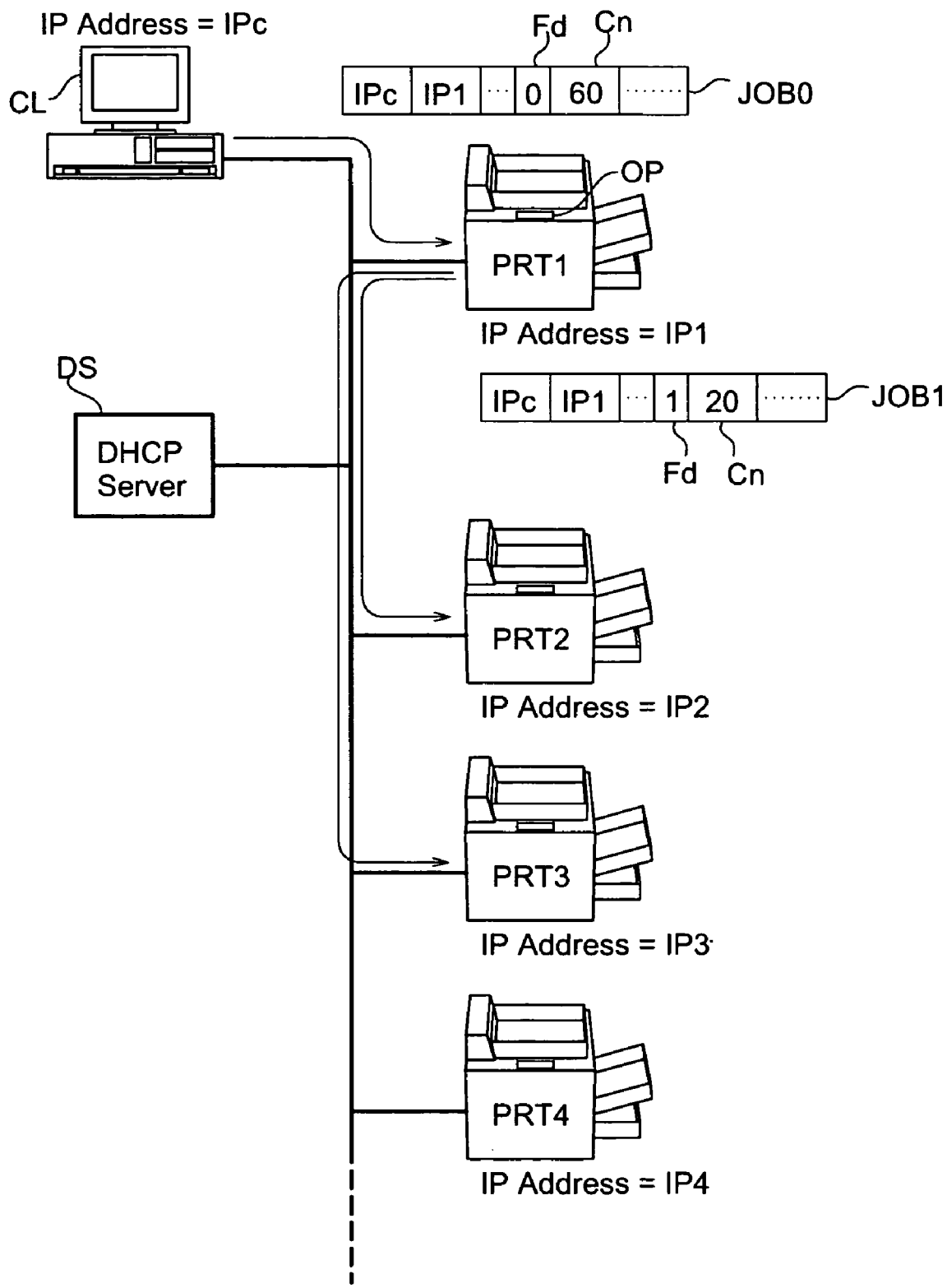
FIG. 13 schematically illustrates the construction of a printing system in a fifth embodiment of the invention.

FIG. 13 schematically illustrates the construction of a printing system in a fifth embodiment of the invention. A print job JOB0 has information including an IP address 'IPc' of a sender, an IP address 'IP1' of a receiver, a distribution control flag Fd='0', and specification of a number of copies to be printed as '60 copies'. The distribution control flag Fd is set either equal to '0', which represents permission of distribution to another printer, or equal to '1', which represents prohibition of distribution to another printer.

The distribution control flag Fd included in the received print job JOB0 is set equal to '0', so that the printer PRT1 distributes the print job JOB0 to alternative printers PRT2 and PRT3. The '60 copies' specified as the number of copies to be printed in the print job JOB0 are equally divided for printing into the three printers PRT1, PRT2, and PRT3. The printer PRT1 accordingly generates a modified print job JOB1 by changing the specification of the number of copies to be printed to '20 copies'. The distribution control flag Fd in the modified print job JOB1 is set equal to '1' to prohibit redistribution of the print job JOB1. The printer PRT1 transmits the modified print job JOB1 thus generated to the respective alternative printers PRT2 and PRT3. Since further distribution is prohibited, each of the printers PRT2 and PRT3 does not distribute the print job JOB1, which includes specification of the plural number of copies to be printed, to any other printers. In the process of transmission to the printer PRT2, the IP address 'IP1' of the printer PRT1 is set to the IP address of the sender, and the IP address 'IP2' of the printer PRT2 is set to the IP address of the receiver. Similarly in the process of transmission to the printer PRT3, the IP address 'IP1' of the printer PRT1 is set to the IP address of the sender, and the IP address 'IP3' of the printer PRT3 is set to the IP address of the receiver.

E2. Distributed Printing Process

Figure 14:
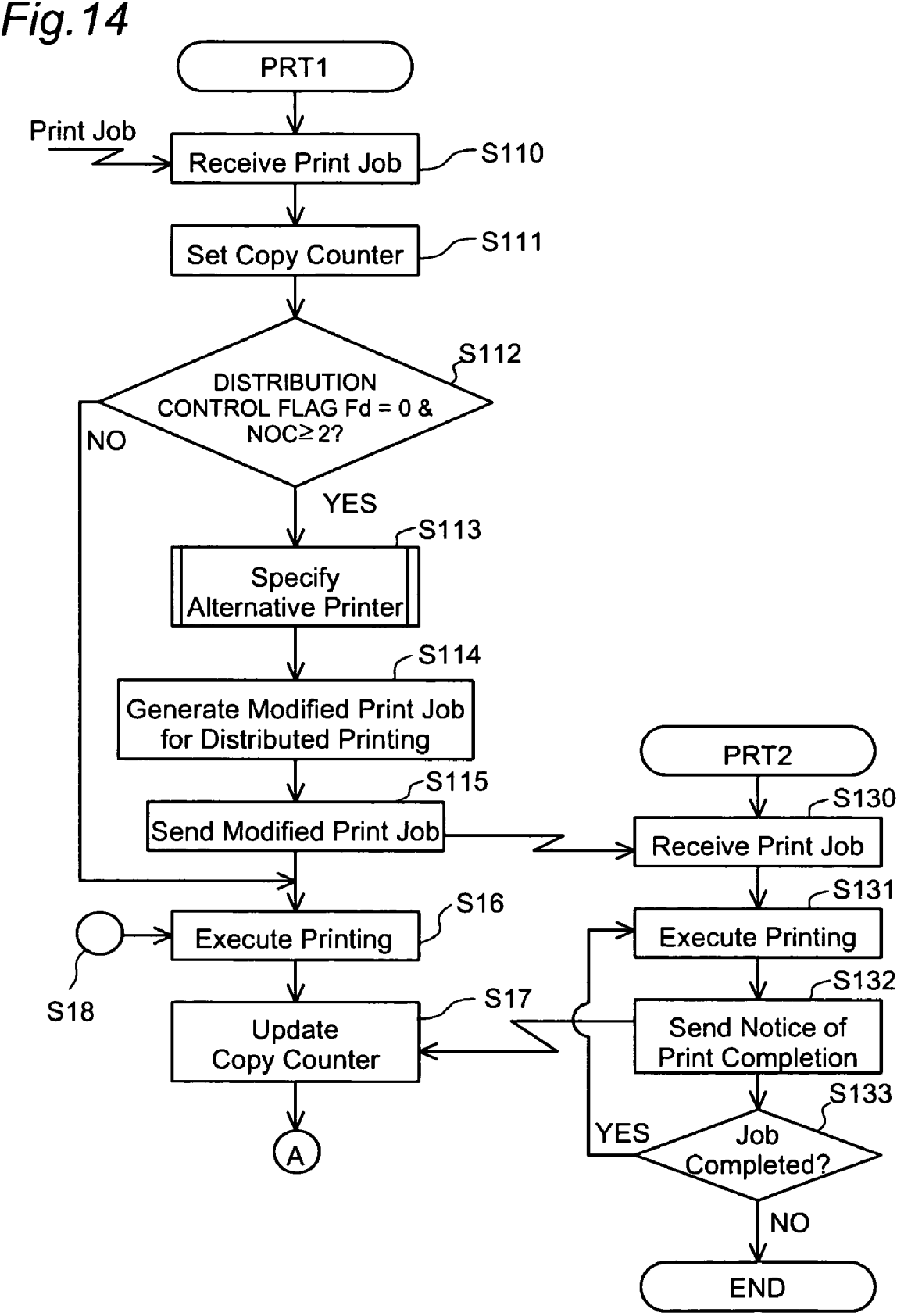
FIG. 14 is a flowchart showing a distributed printing routine executed in the fifth embodiment.
Figure 15:
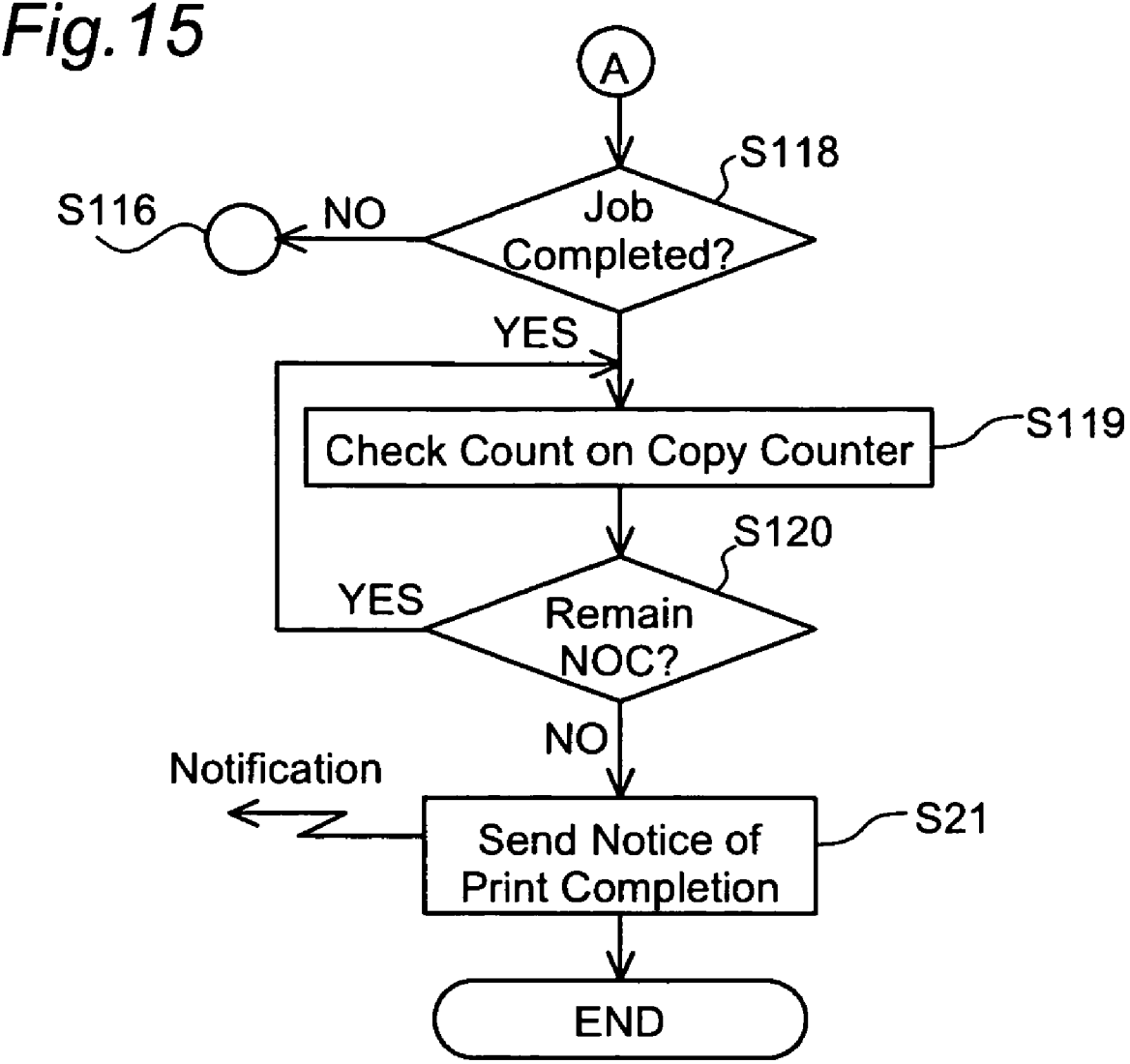
FIG. 15 is a flowchart showing the distributed printing routine executed in the fifth embodiment.

FIGS. 14 and 15 are flowcharts showing a distributed printing routine executed by the control unit of the printer. In the following discussion, it is assumed that the printer PRT1 receives a print job and distributes the print job to the printer PRT2.

The printer PRT1 receives a print job (step S110) and sets a specified number of copies in the received print job to a copy counter (step S111). The printer PRT1 also stores the information regarding the sender of the print job, for example, the IP address, for later notification of print completion.

When the distribution control flag Fd is set equal to '0' and the specified number of copies is not less than 2 (step S112), the printer PRT1 carries out a distribution process discussed below. The printer PRT1 specifies an alternative printer as a destination of distribution as discussed below (step S113), and generates a modified print job, which is to be sent to another printer and to be executed by the printer PRT1 itself, by changing the specification of the number of copies to be printed (step S114). The procedure of this embodiment sets the result that is obtained by dividing the number of copies to be printed by the number of printers used for distributed printing, to the number of copies to be printed in the modified print job. The printer PRT1 then sends the modified print job to the specified alternative printer (step S115). Here the alternative printer may be singular or plural.

The printer PRT1 itself executes printing in the meanwhile of this distribution process (step S116). When the distribution control flag Fd is set equal to '1' or the specified number of copies is only '1 copy' (step S112), the printer PRT1 skips the above series of distribution process and immediately executes printing (step S116).

In the structure of this embodiment, each printer receiving a print job, which includes specification of a plural number of copies to be printed, sends a notice of print completion every time printing of one copy is completed. The printer PRT1 updates the count on the copy counter every when printing of one copy is completed by the printer PRT1 itself (step S117). According to the concrete procedure, the printer PRT1 receives a notice of print completion from itself and subtracts '1 copy' from the count on the copy counter. The printer PRT1 also receives a notice of print completion from each alternative printer specified as the destination of distribution and subtracts '1 copy' from the count on the copy counter.

The printer PRT1 determines whether the print job to be printed by itself has been completed (step S118). When the print job has not yet been completed, the program returns to step S116 to continue printing. When the print job has already been completed, on the other hand, the printer PRT1 refers to the count on the copy counter to check the remaining number of copies to be printed, that is, the number of copies that has not yet been printed and is to be printed by the specified alternative printers (step S119). The printer PRT1 subsequently determines whether there is any remaining number of copies to be printed (step S120). When there is any remaining number of copies to be printed, the program returns to step S119. The program repeatedly checks the count on the copy counter at preset intervals, until all the required printing is completed and there is no remaining number of copies to be printed. On completion of all the required printing, the printer PRT1 sends a notice of print completion to the sender of the original print job (step S121).

As shown in the flowchart of FIG. 14, the printer PRT2 that has received distribution of the print job as one alternative printer carries out a series of processing discussed below. In the structure of this embodiment, the print job received by the printer PRT2 includes '20 copies' as the specified number of copies to be printed. The printer PRT2 receives the transmitted print job (step S130) and carries out printing without further distribution of the received print job to any other printers (step S131). Every time printing of one copy is completed, the printer PRT2 sends a notice of print completion to the printer PRT1 as the sender of the distributed print job (step S132). The printer PRT2 subsequently determines whether the print job has been completed (step S133). When the print job has not yet been completed, the program returns to step S131 to continue printing. On completion of the print job, the program exits from this distributed printing routine.

Figure 16:
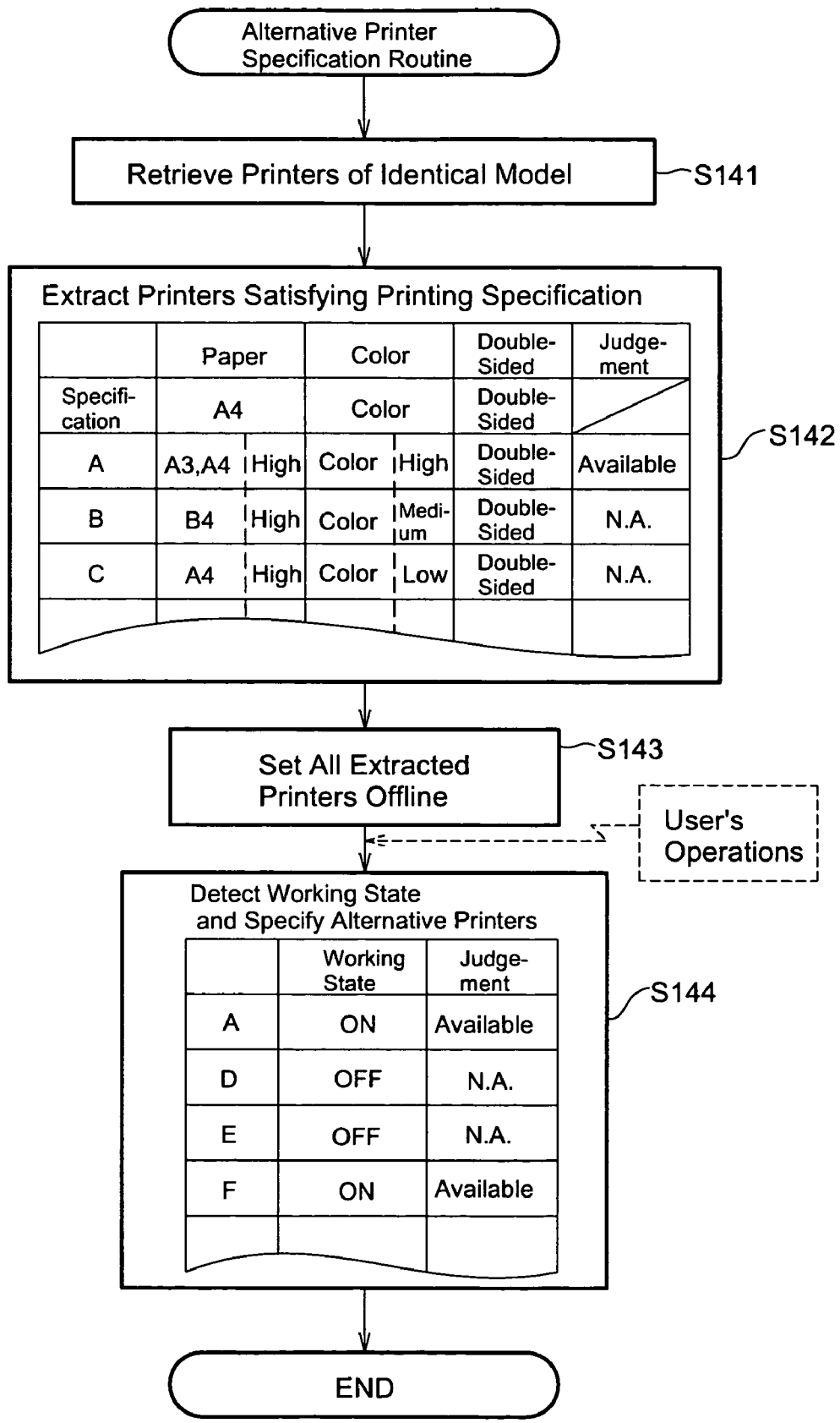
FIG. 16 is a flowchart showing an alternative printer specification routine executed in the fifth embodiment.

FIG. 16 is a flowchart showing an alternative printer specification routine, which is executed by the control unit of the printer PRT1. This routine shows the details of the process of specifying the alternative printer at step S113 in the flowchart of FIG. 14.

The printer PRT1 first retrieves printers of the identical model on the network (step S141). The retrieval process may utilize the SNMP protocol to send inquiries about the model to each printer on the network by broadcast.

The printer PRT1 subsequently extracts printers that satisfy printing specifications specified in the print job among the retrieved printers (step S142). One example of printing specifications is shown in FIG. 16. The printing specifications include, for example, available sizes of printing paper, availability of color/monochromatic printing, and availability of double-sided printing. The extraction process may also utilize the SNMP protocol to make inquiries about specifications of each printer. The procedure of this embodiment also inquires the remaining amounts of consumables, that is, printing paper and ink.

In the illustrated example, the printing specifications specified in the print job are printing paper of size A4, color printing, and double-sided printing. The results of inquiries sent back from retrieved printers A, B, and C are shown as an example. The printer A is available for printing on the size A3 and size A4 printing papers, color printing, and double-sided printing and has the 'high level' as both the remaining amounts of printing paper and ink. The printer A thus satisfies all the printing specifications and is judged as 'Available', that is, as a possible option for the destination of distribution.

The printer B is available for printing on only the size B4 printing papers and thus does not satisfy the printing specifications. The printer C has the 'low level' as the remaining amount of ink and thus does not satisfy the printing specifications. These printers B and C are accordingly judged as N. A. (Not Available), that is, not possible options for the destination of distribution.

The level of the remaining amount of each consumable may be evaluated by comparison with a preset reference value or by taking into account the printing specifications specified in the print job. For example, when the print job specifies printing of 100 copies, 100 sheets of printing paper may be set to the reference value to evaluate the level of the remaining quantity of printing paper. The level of the remaining amount of ink may be evaluated, for example, by calculating an expected consumption of ink on the basis of the amount of print data. The printers may be extracted without considering the remaining amounts of the consumables. The arrangement of the embodiment that takes account of the remaining amounts of the consumables advantageously prevents a potential interruption of printing, due to the insufficient consumable. This is especially preferable in the case of printing a large number of copies, since the interruption of printing may lead to confusion of the total number of printed copies.

The printer PRT1 then sets the working state of all the extracted printers offline (step S143). One applicable method adds offline setting information to an SNMP packet and sends the SNMP packet by broadcast to attain the offline setting. Another applicable method individually sends the SNMP packet to each printer by unicast. The user who has sent a print job from the client CL goes to a desired printer specified as the destination of distribution and manually sets the desired printer online as shown by the broken line. Such online setting may be performed every time the printer receives a print job, or may be performed as the initial settings.

The printer PRT1 specifies, as alternative printers, the printers that have been judged as 'Available' and extracted as the possible options for the destination of distribution at step S142 and have the working state changed from the offline state to the online state (step S144). The detection of the working state is carried out in 30 seconds after the offline setting. The detection may be terminated after elapse of 10 seconds since detection of a last change in working state to the online state. The detection results of the working state of four printers A, D, E, and F extracted as the possible options at step S142 are also shown in FIG. 16. The printers A and F, which have been set online by the user, are detected to be in the 'ON' working state and are judged as 'Available' and specified as the alternative printers. The printers E and F, which have been kept offline, on the other hand, are detected to be in the 'OFF' working state and are judged as 'N.A.' and not specified as the alternative printers. After specification of the alternative printers, the working state of all the printers set offline is changed to the online state. The printers other than the specified alternative printers are then available for general printing. As in the case of the offline setting, one applicable method adds online setting information to an SNMP packet and sends the SNMP packet by broadcast to attain the online setting. Another applicable method individually sends the SNMP packet to each printer by unicast.

The alternative printers are specified according to the procedure discussed above. Part of the diverse conditions discussed above for specification of the alternative printers may be omitted according to the requirements. One modified procedure may omit the processing of step S141 and include printers of different models as possible options of the alternative printer. The identical model set as the condition of the retrieval is advantageous, however, since the identical model does not require any conversion of the print data included in the print job for printing and is free from any potential trouble due to a difference in font, thus ensuring uniform printing results.

E3. Copy Number Management

Figure 17:
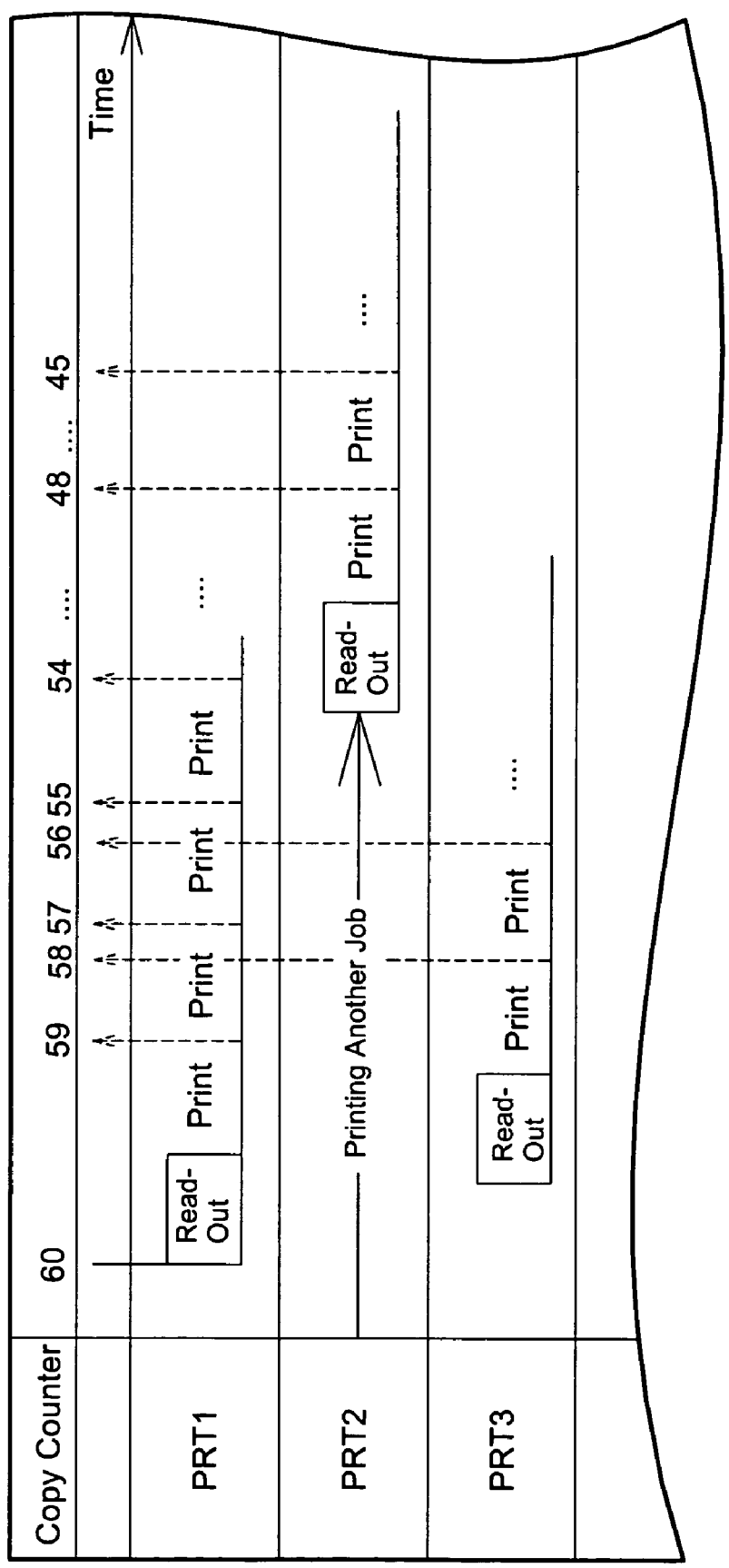
FIG. 17 shows a working example of distributed printing in the fifth embodiment.

FIG. 17 shows a working example of distributed printing. In the illustrated sequence, the printer PRT1 receives a print job of printing 60 copies and distributes the received print job to alternative printers PRT2 and PRT3 for printing.

As illustrated, when the printer PRT1 accepts the print job, the copy counter is set to 60 copies. The printer PRT1 itself reads out and prints data of the print job, and synchronously transfers a modified print job, which includes a modified number of copies to be printed, to the printers PRT2 and PRT3. The system of the fifth embodiment equally divides the 60 copies to be printed into the three printers PRT1, PRT2, and PRT3. The number of copies set in the modified print job is thus equal to 20 copies.

The printer PRT1 updates the count on the copy counter when printing of one copy by the printer PRT1 itself is completed. At this moment, the count on the copy counter is thus reduced to 59 copies. The printer PRT3 reads out the received modified print job and starts printing. Every time printing of one copy is completed, the printer PRT3 sends a notice of printing completion to the printer PRT1 as the sender of the modified print job. The printer PRT1 updates the count on the copy counter, when receiving this notice of printing completion. At this moment, the count on the copy counter is thus reduced to 58 copies.

As the printers PRT1 and PRT3 carry out the current print job, the printer PRT2 has completed another print job. The printer PRT2 then reads out the modified print job sent from the printer PRT1 and starts printing. The printers PRT1 and PRT3 continue printing to 2 copies, 3 copies, . . . , before the printer PRT1 receives a first notice of print completion from the printer PRT2. The count on the copy counter is successively updated. When the printer PRT1 receives the first notice of print completion from the printer PRT2, the counter on the copy counter is reduced to 48 copies.

As discussed above, the procedure of the fifth embodiment attains distributed printing that reflects the user's desired distribution range in the small-scaled system. The 'identical model' is set as the condition of retrieval for the possible option of the alternative printer. This desirably ensures the uniform printing results. The procedure of this embodiment also carries out the copy number management and successively displays the current number of copies to be printed on the operation panel. The user can thus conveniently grasp the progress of printing.

F. Sixth Embodiment

F1. Outline of System

In the system of the fifth embodiment, the printer connecting with the network retrieves printers of the identical model as possible options for the destination of distribution. A system of a sixth embodiment retrieves printers in a range of an identical subnet with the subnet of the distribution source printer as the possible options for the destination of distribution. Such modification is attained by replacing the condition of retrieval 'printers of the identical model' in the fifth embodiment at step S141 in the flowchart of FIG. 16 with another condition of retrieval 'printers of the identical subnet'. Some conditions may be combined for the retrieval like 'printers of the identical model and the identical subnet'. A diversity of techniques may be applied to obtain the network address. One applicable method adds a response command, which instructs a response including model information, to an IP packet, sends the IP packet by broadcast, and retrieves the printers satisfying the conditions among response packets.

Figure 18:
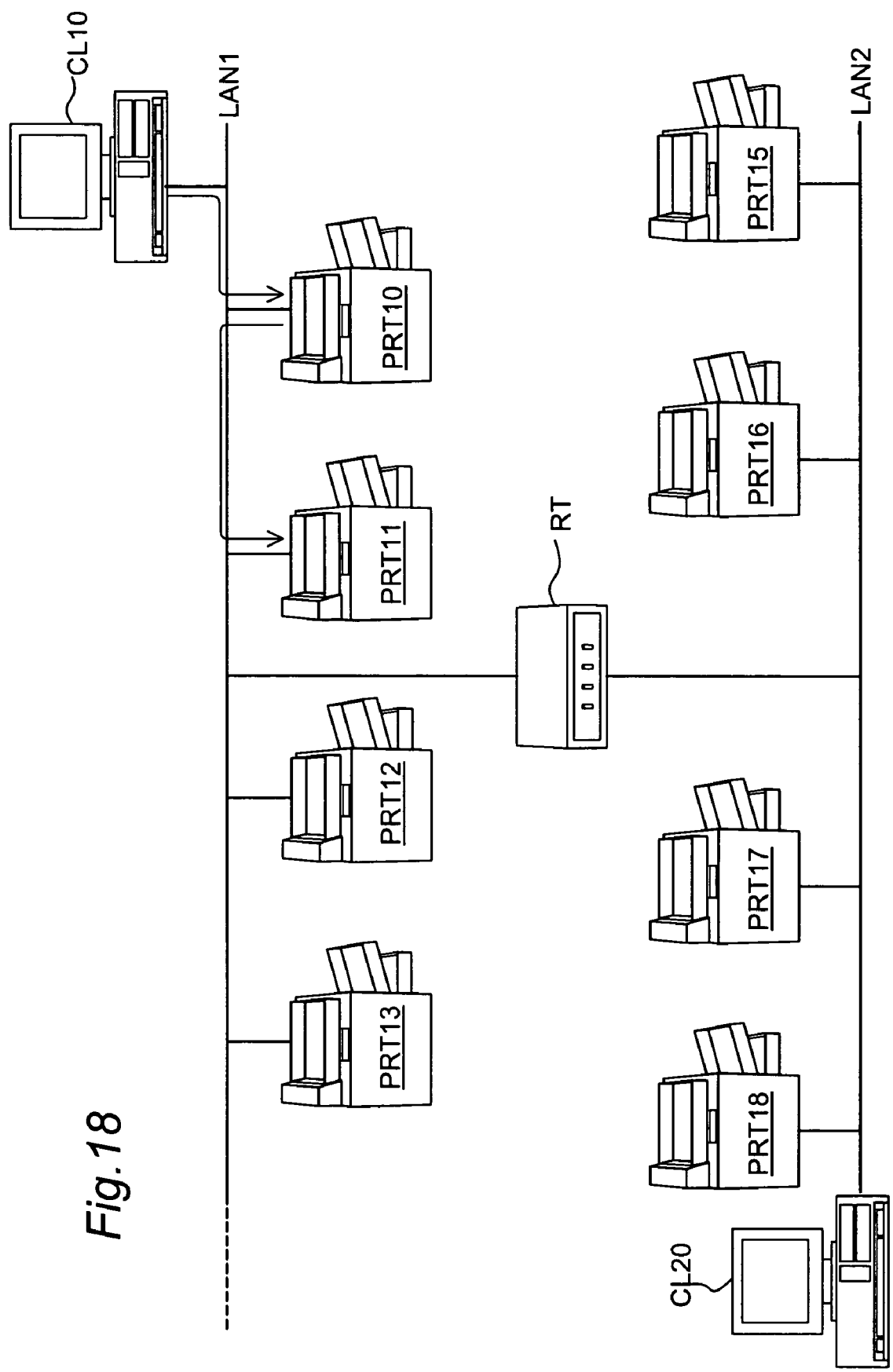
FIG. 18 schematically illustrates the construction of a printing system in a sixth embodiment of the invention.

In an illustrated system of FIG. 18, a client CL10 and printers PRT10 through PRT13 having the job transfer function of the invention are connected to a LAN1. A client CL20 and printers PRT15 through PRT18 also having the job transfer function of the invention are connected to a LAN2. The LAN1 and the LAN2 are connected with each other via a router RT.

When the client CL10 sends a print job including specification of a number of copies to be printed as '20 copies' to the printer PRT10, the printer PRT10 analyzes the print job and detects the printers PRT11 through PRT13 having the identical subnet. Here it is assumed that the user sets the printers PRT11 and PRT15 to the destinations of distribution, since these printers PRT11 and PRT15 have the closer physical locations. The printer PRT15, however, has a different subnet from the subnet of the printer PRT10, and is thus not specified as an alternative printer. The printer PRT11 alone is thus specified as an alternative printer. Since the total of two printers are in charge of distributed printing, the printer PRT10 creates a modified print job including specification of a number of copies to be printed as '10 copies' and sends the modified print job to the specified printer PRT11.

As discussed above, the system of the sixth embodiment specifies the alternative printers based on the user's operation, among the retrieved printers that satisfy the preset condition. This arrangement allows for flexible setting of the retrieval conditions and thus enhances the convenience. This system is especially useful for separate management of devices in the respective networks.

G. Modifications

G1. Modified Example 1

The procedure of the fifth embodiment sets offline all the printers extracted as the possible options for the destination of distribution and specifies the printers that have changed the working state from the offline state to the online state by the user's operation as the alternative printers. This procedure is, however, not restrictive at all. One possible modification may close a front panel of all the printers extracted as the possible options for the destination of distribution and specify the printers having the front panel opened by the user as the alternative printers. Another modified procedure may monitor paper cassettes of the printers extracted as the possible options for the destination of distribution and specify the printers having replaced paper cassettes as the alternative printers. Namely the procedure detects a preset direct operation of the user on the printers extracted as the possible options for the destination of distribution and specifies the alternative printers in response to the user's operation.

G2. Modified Example 2

The procedure of the sixth embodiment retrieves the printers of the identical subnet as the possible options for the destination of distribution. A diversity of restrictions may be imposed on the range of retrieval. One example is retrieval of printers having closer IP addresses to the IP address of the printer PRT11. Another example is retrieval of printers in an arbitrary specified group. Some of such restrictions may be combined for the retrieval.

G3. Modified Example 3

The procedure of the fifth embodiment displays the progress of distributed printing on the operation panel of the printer. The progress of distributed printing may alternatively be shown on a display of the client CL as the sender of the original print job. Another applicable procedure shows the printers extracted as the possible options for the destination of distribution on the display of the client CL and specifies the alternative printers, based on a selective input from the client CL, instead of the user's direct operation on the printers.

G4. Modified Example 4

The procedure of the fifth embodiment retrieves the 'printers of the identical model' as the possible options for the destination of distribution, and the procedure of the sixth embodiment retrieves the 'printers of the identical subnet'. The procedure may take into account a communication speed for the retrieval of the printers. The communication speed of each printer is evaluated from a response time according to the SNMP protocol or a response time to a 'ping' command. Only printers that are communicable at the communication speed of or over a preset level are selected as the alternative printers. This arrangement ensures quick transfer of the print job and desirably shortens the overall required time.

G5. Modified Example 5

The procedures of the fifth and the sixth embodiments use the distribution control flag Fd to set the permission or prohibition of distribution. One possible modification may set the permission or prohibition of distribution in each port on the TCP/IP receiving a print job. For example, when a port '9100' and another port '19100' are set on a printer connecting with a network and having the alternative printing function of the invention, the modified procedure prohibits distribution of a print job received at the port '9100' but allows a print job received at the port '19100' to be distributed in the form of a modified print job to another printing device on the same network having the alternative printing function of the invention. This arrangement does not require the distribution control flag Fd and attains distributed printing by the simple system construction.

G6. Modified Example 6

The procedures of the fifth embodiment and the sixth embodiment specify the printers undergoing the user's direct operation as the alternative printers. One possible modification may specify the printers undergoing the user's direct operation as non-alternative printers. In the case where the user desires to exclude only one old-model printer, which is present among multiple printers, from the destination of distribution, this modified procedure requires the user to make the operation only on the undesired printer for specification as the non-alternative printer. This effectively relieves the load of the user.

The embodiments discussed above are to be considered in all aspects as illustrative and not restrictive. There may be many modifications, changes, and alterations without departing from the scope or spirit of the main characteristics of the present invention. For example, the principle of the present invention is applicable to projectors, display devices, acoustic equipment, and a variety of other output devices, as well as printing devices discussed above.

The scope and spirit of the present invention are indicated by the appended claims, rather than by the foregoing description.

What is claimed is:

1. A printing device connecting with a network, the printing device comprising:
    a data receiver module that receives a print job, which includes specification of a number of copies to be printed and is transmitted from a device connecting with the network;
    a printing device specification module that specifies each of other printing devices connecting with the network as an alternative printing device to which the print job is transferable;
    a job transfer module that, when the specified number of copies to be printed is a plural number, transfers a modified print job, which includes setting of a lesser number of copies than the specified number as a number of copies to be transferred, to at least part of the specified alternative printing devices for printing; and
    a copy number management module that manages a total number of copies including a number of copies printed by the at least part of the specified alternative printing devices, so as to eventually attain printing of the specified number of copies, and determines whether there are still multiple copies to be printed, wherein the print job and the modified print job include print data, and wherein the job transfer module repeatedly executes the transfer of the modified print job, in a case where there are still multiple copies to be printed.

2. A printing device in accordance with claim 1, wherein the specified alternative printing device has a function of spooling a print job therein, and the job transfer module does not retransmit the modified print job to the alternative printing device that spools the modified print job transferred thereto, but transmits an execution instruction of the modified print job.

3. A printing device in accordance with claim 1, wherein the copy number management module notifies the device, which has transmitted the print job, of a total number of printed copies including the number of copies printed by at least part of the specified alternative printing devices.

4. A printing device in accordance with claim 1, wherein the number of copies set in the modified print job is equal to 1.

5. A printing device in accordance with claim 1, wherein the printing device specification module retrieves a printing device on the network that is able to execute printing of the print job received by the printing device without any conversion and specifies the retrieved printing device as the alternative printing device.

6. A printing device in accordance with claim 1, wherein the printing device specification module specifies a residual operating life with regard to each of the specified alternative printing devices, and the job transfer module sets the number of copies to be transferred to each of the specified alternative printing devices, based on the specified residual operating life.

7. A printing device in accordance with claim 6, wherein the job transfer module increases the number of copies to be transferred to the specified alternative printing device that has a longer residual operating life.

8. A printing device in accordance with claim 6, wherein each of the specified alternative printing devices has a preset target time reaching its operating life, and the job transfer module sets the number of copies to be transferred to each of the specified alternative printing devices by taking into account the target time.

9. A printing device in accordance with claim 1, wherein the job transfer module transfers the modified printing job with control information that prohibits further transfer of the modified print job from the specified alternative printing device to another printing device.

10. A printing device in accordance with claim 1, wherein the printing device specification module retrieves a printing device on the network that has received either of the print job and the modified print job and excludes the retrieved printing device from specification of the alternative printing device.

11. A printing device in accordance with claim 1, wherein the job transfer module, when a print job received from another printing device connecting with the network is transferred to the specified alternative printing device, notifies the another printing device, as a sender of the print job, of specification of the alternative printing device as a transfer destination.

12. A printing device in accordance with claim 1, the printing device further comprising:

a tabulated data transmission module that, when the data receiver module receives a print job from a device other than a printing device, generates tabulated data for specifying all printing devices that execute either of the print job and the modified print job, based on a notification from each of the specified alternative printing devices, and transmits the tabulated data to each of the specified alternative printing devices.

13. A printing device in accordance with claim 1, the printing device further comprising:

a required time evaluation module that evaluates a time required for execution of the modified print job with regard to each of the other printing devices on the network, wherein the printing device specification module excludes each of the other printing devices having the required time of not less than a preset level from specification of the alternative printing device.

14. A printing device in accordance with claim 1, the printing device further comprising:

a printing execution module that executes printing of the modified print job, wherein the job transfer module executes the transfer of the modified print job, synchronously with an operation of the printing execution module to read out the modified print job.

15. A printing device in accordance with claim 1, wherein the job transfer module comprises:

a divisional transmission sub-module that divides the modified print job into multiple divisional data and transmits the multiple divisional data to the specified alternative printing device; and a pointer management sub-module that manages a pointer for identifying a data position where transmission of the modified print job is completed, with regard to each of the specified alternative printing devices.

16. A computer readable recording medium, in which a computer program for controlling a printing device connecting with a network is recorded, wherein the computer program causes a computer incorporated in the printing device to attain the functions of:

receiving a print job, which includes specification of a number of copies to be printed and is transmitted from a device connecting with the network;

specifying each of other printing devices connecting with the network as an alternative printing device to which the print job is transferable;

when the specified number of copies to be printed is a plural number, transferring a modified print job, which includes setting of a lesser number of copies than the specified number as a number of copies to be transferred, to at least part of the specified alternative printing devices for printing;

managing a total number of copies including a number of copies printed by the at least part of the specified alternative printing devices, so as to eventually attain printing of the specified number of copies; and determining whether there are still multiple copies to be printed, wherein the print job and the modified print job include print data, and wherein, in a case where there are still multiple copies to be printed, the transferring of the modified print job is repeatedly executed.

* * * * *